(12) United States Patent
Monismith et al.

(10) Patent No.: US 10,910,608 B2
(45) Date of Patent: Feb. 2, 2021

(54) ELECTRIC VEHICLE BATTERY CELL

(71) Applicant: SF Motors, Inc., Santa Clara, CA (US)

(72) Inventors: Scott Quinlan Freeman Monismith, Santa Clara, CA (US); Brennan Campbell, Santa Clara, CA (US); Ying Liu, Santa Clara, CA (US); Yifan Tang, Santa Clara, CA (US)

(73) Assignees: CHONGQING JINKANG NEW ENERGY VEHICLE CO., LTD., Chongqing (CN); SF MOTORS, INC., Santa Clara, CA (US)

( * ) Notice: Subject to any disclaimer, the term of this patent is extended or adjusted under 35 U.S.C. 154(b) by 297 days.

(21) Appl. No.: 15/974,091

(22) Filed: May 8, 2018

(65) Prior Publication Data

US 2019/0296269 A1 Sep. 26, 2019

Related U.S. Application Data

(60) Provisional application No. 62/646,995, filed on Mar. 23, 2018.

(51) Int. Cl.
*H01M 2/04* (2006.01)
*H01M 2/02* (2006.01)
(Continued)

(52) U.S. Cl.
CPC ......... *H01M 2/046* (2013.01); *H01M 2/0237* (2013.01); *H01M 2/0262* (2013.01);
(Continued)

(58) Field of Classification Search
None
See application file for complete search history.

(56) References Cited

U.S. PATENT DOCUMENTS

2006/0051665 A1* 3/2006 Rigobert ................. H01M 2/08
429/179
2011/0183165 A1 7/2011 Byun et al.
(Continued)

FOREIGN PATENT DOCUMENTS

DE 11 2015 001 939 1/2017

OTHER PUBLICATIONS

International Search Report and Written Opinion for PCT/US2018/031835 dated Jan. 15, 2019.

*Primary Examiner* — Ula C Ruddock
*Assistant Examiner* — Tony S Chuo
(74) *Attorney, Agent, or Firm* — Foley & Lardner LLP

(57) ABSTRACT

Provided herein are a battery cell of a battery pack for electric vehicles. A housing for the battery cell can have a body and a head region. The body region can include an electrolyte, anode, and cathode. The battery cell can include a first sealing element disposed in an opening of the head region. The first sealing element can define two slots for disposing a second sealing element and a third sealing element respectively. A first conductive contact for a positive terminal coupled to the cathode can be disposed in the second sealing element. A second conductive contact for a negative terminal coupled to the anode can be disposed in the third sealing element. A first protector element disposed below the second sealing element can react to a first failure condition. A second protector element disposed below the third sealing element can react to a second failure condition.

20 Claims, 7 Drawing Sheets

(51) Int. Cl.
  *H01M 2/08* (2006.01)
  *H01M 2/10* (2006.01)
  *H01M 2/14* (2006.01)
  *H01M 2/34* (2006.01)
  *H01M 2/26* (2006.01)
  *H01M 10/04* (2006.01)
  *H01M 2/20* (2006.01)

(52) U.S. Cl.
  CPC ....... *H01M 2/0277* (2013.01); *H01M 2/0285* (2013.01); *H01M 2/0408* (2013.01); *H01M 2/0413* (2013.01); *H01M 2/0434* (2013.01); *H01M 2/08* (2013.01); *H01M 2/1077* (2013.01); *H01M 2/14* (2013.01); *H01M 2/206* (2013.01); *H01M 2/26* (2013.01); *H01M 2/34* (2013.01); *H01M 10/0413* (2013.01); *H01M 10/0422* (2013.01); *H01M 2220/20* (2013.01)

(56) References Cited

U.S. PATENT DOCUMENTS

| | | |
|---|---|---|
| 2012/0114979 A1 | 5/2012 | Kim et al. |
| 2017/0047578 A1* | 2/2017 | Minagata ............... H01G 11/14 |
| 2018/0313584 A1* | 11/2018 | Henke ................ B60H 1/00278 |

* cited by examiner

ELECTRIC VEHICLE BATTERY CELL

CROSS-REFERENCES TO RELATED APPLICATIONS

This application claims priority under 35 U.S.C. § 119(e) to U.S. Provisional Application No. 62/646,995, filed Mar. 23, 2018, titled "ELECTRIC VEHICLE BATTERY CELL," which is incorporated herein by reference in its entirety.

BACKGROUND

Batteries can include electrochemical material to supply electrical power to various electrical components connected thereto. A vehicle such as an automobile can provide electrical energy to various electrical systems installed within the vehicle.

SUMMARY

The present disclosure is directed to batteries cells for battery packs in electrical vehicles. The disclosed battery cell can have both a positive terminal and a negative terminal on one end of the cell. Such a configuration allow for improvement in protection of the constituent component within the battery cell and consumption of time during the pack assembly process.

At least one aspect is directed to a battery cell of a battery pack for electric vehicles. The battery cell may include a housing disposed in a battery pack for a plurality of battery cells. The housing can have a body region and a head region. The body region can include an electrolyte, a first electrode, and a second electrode. The head region can define an opening at a lateral end of the housing. The battery cell can include a first sealing element disposed in the opening defined by the head region. The first sealing element can define a first slot and a second slot. The battery cell can include a second sealing element disposed in the first slot defined by the first sealing element. The second sealing element can define a first opening for a first polarity terminal. The battery cell can include a third sealing element disposed in the second slot defined by the second sealing element. The third sealing element can define a second opening for a second polarity terminal. The battery cell can include a first conductive contact disposed in the first opening defined by the second sealing element. The first conductive element can include the first polarity terminal to electrically couple with a first bonding element connected to the first electrode. The battery cell can include a second conductive contact disposed in the second opening defined by the third sealing element. The second conductive element can include the second polarity terminal to electrically couple with a second bonding element connected to the second electrode. The second conductive contact can be electrically isolated from the first conductive contact. The battery cell can include a first protector element disposed between the second sealing element and the first electrode to react during a first failure condition that occurs within the body region. The battery cell can include a second protector element disposed between the third sealing element and the second electrode to react during a second failure condition that occurs within the body region. The second failure condition can be different from the first failure condition.

At least one aspect is directed to a method of providing battery cells for battery packs of electric vehicles. The method can include providing a housing for a battery cell of a battery packing having a plurality of battery cells. The housing can have a body region and a head region. The head region can define an opening at a lateral end of the housing. The method can include housing, within the body region, an electrolyte, a first electrode, and a second electrode. The method can include disposing, in the opening defined by the head region, a first sealing element defining a first slot and a second slot. The method can include arranging, in the first slot defined by the first sealing element, a second sealing element defining a first opening for a first polarity terminal. The method can include arranging, in the second slot defined by the second sealing element, a third sealing element defining a second opening for a second polarity terminal. The method can include disposing, in the first opening defined by the second sealing element, a first conductive element including the first polarity terminal to electrically couple with a first bonding element connected to the first electrode. The method can include disposing, in the second opening defined by the third sealing element, a second conductive element including the second polarity terminal to electrically couple with a second bonding element connected to the second electrode. The second conductive contact can be electrically isolated from the first conductive contact. The method can include disposing, between the second sealing element and the first electrode, a first protector to react during a first failure condition that occurs within the body region. The method can include disposing, between the third sealing element and the second electrode, a second protector to react during a second failure condition that occurs within the body region. The second failure condition can be different from the first failure condition.

At least one aspect is directed to a method of supplying battery cells for battery packs of electric vehicles. The method can include providing a battery cell for a battery pack. The battery cell may include a housing disposed in the battery pack for a plurality of battery cells. The housing can have a body region and a head region. The body region can include an electrolyte, a first electrode, and a second electrode. The head region can define an opening at a lateral end of the housing. The battery cell can include a first sealing element disposed in the opening defined by the head region. The first sealing element can define a first slot and a second slot. The battery cell can include a second sealing element disposed in the first slot defined by the first sealing element. The second sealing element can define a first opening for a first polarity terminal. The battery cell can include a third sealing element disposed in the second slot defined by the second sealing element. The third sealing element can define a second opening for a second polarity terminal. The battery cell can include a first conductive contact disposed in the first opening defined by the second sealing element. The first conductive element can include the first polarity terminal to electrically couple with a first bonding element connected to the first electrode. The battery cell can include a second conductive contact disposed in the second opening defined by the third sealing element. The second conductive element can include the second polarity terminal to electrically couple with a second bonding element connected to the second electrode. The second conductive contact can be electrically isolated from the first conductive contact. The battery cell can include a first protector element disposed between the second sealing element and the first electrode to react during a first failure condition that occurs within the body region. The battery cell can include a second protector element disposed between the third sealing element and the second electrode to react during a second failure condition that occurs within the body region. The second failure condition can be different from the first failure condition.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
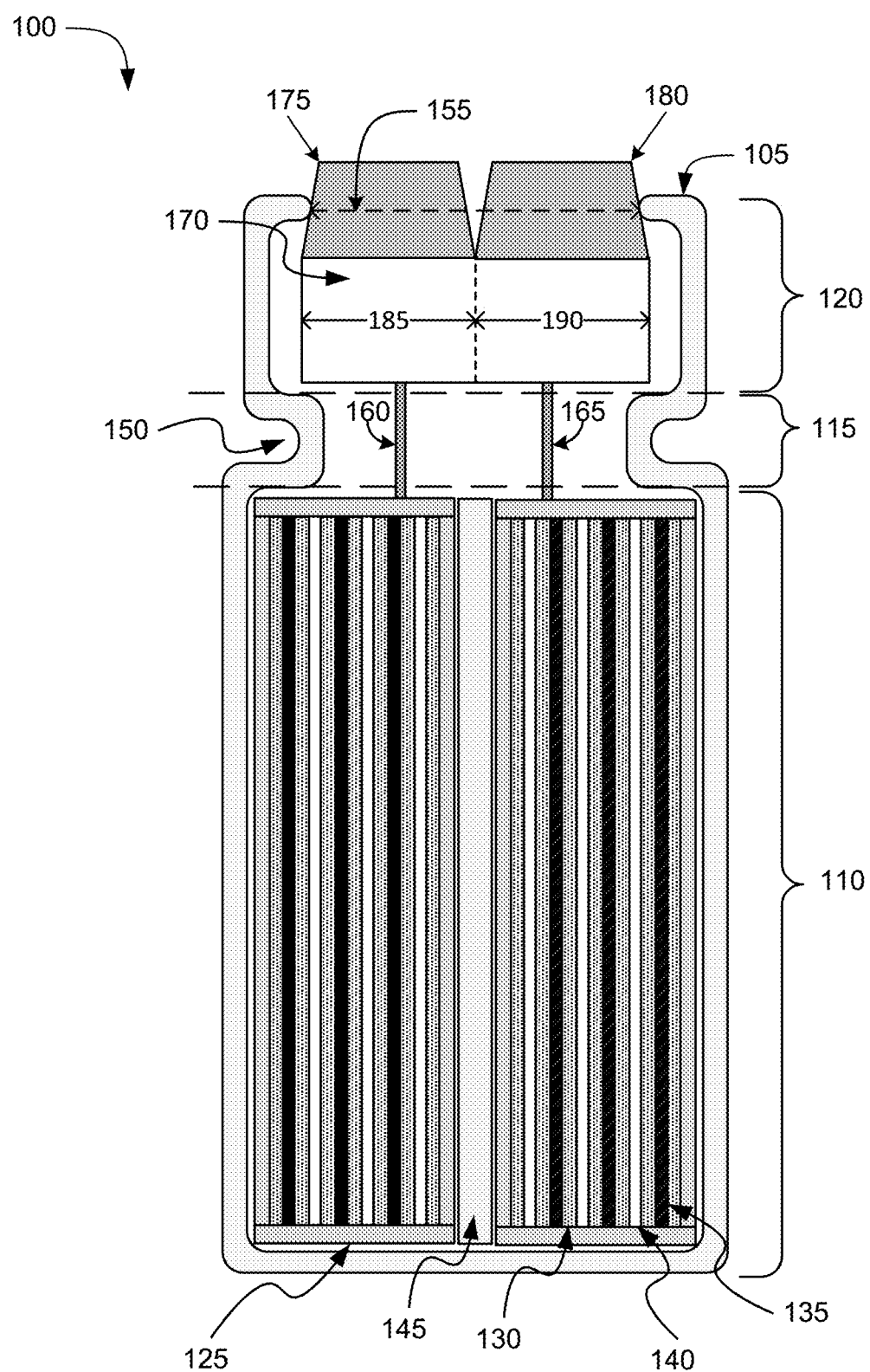
FIG. 1 is a block diagram depicting a cross-sectional view of an example battery cell for a battery pack in an electric vehicle.

Following below are more detailed descriptions of various concepts related to, and implementations of battery cells for battery packs in electric vehicles. The various concepts introduced above and discussed in greater detail below can be implemented in any of numerous ways.

Described herein are battery cells for battery packs in electric vehicles for an automotive configuration. An automotive configuration includes a configuration, arrangement or network of electrical, electronic, mechanical or electromechanical devices within a vehicle of any type. An automotive configuration can include battery cells for battery packs in electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

One architecture of a cylindrical lithium ion (or other type of) battery cell can include a deep-drawn metal cylinder casing and a protective cap at the top end. The protective cap can include devices to prevent against fires and explosions. Electrical current can flow from an anode housed within the casing to an anode tab and then through the casing itself via a bonded wire connection. In this manner, the casing of the battery cell can function as the negative terminal. The positive terminal of the battery cell can be on a lateral (e.g., top) end of the structure, and can include a lid. The lid can include a current interrupt device (CID), a rupture disk, and a gasket. The lid can reside within the gasket. The sealing element can insulate the positive terminal from the negative terminal of the battery cell.

This construction can pose a problem from the perspective of pack assembly in EV settings. Each battery cell can be attached to a negative busbar by bonding a wire between a crimped area of the casing and the negative busbar and to a positive busbar by bonding another wire between a table top and the positive busbar. Connecting the wires to the crimped area of the battery cell in this manner can be challenging, as there can be very little flat or otherwise bondable area for a wire to bond to. Each battery cell can also be attached to the negative busbar by bonding one wire to a bottom or side of the battery cell and to the positive busbar by bonding another wire to a top of the battery cell. Bonding to both ends of the battery cell can involve setting up specialized production lines to bond wires in this fashion. In either case, all the battery cells once installed in a battery pack can be insulated electrically from a collecting plate, as the casing for each battery cell can be electrically conductive to function as the negative terminal.

To address these and other technical drawbacks, the battery cell described herein can include both the positive terminal and the negative terminal disposed at a same lateral end (e.g., the top end) of the battery cell. For seating both the tabs for the positive and negative terminals toward one end of the battery cell, a primary sealing element can be disposed toward the same lateral end of the battery cell. The primary sealing element can include two slots for two auxiliary sealing elements corresponding to the positive and negative terminals respectively. Each auxiliary sealing element can hold a conductive contact for the tab coupled for the respective terminal. Further, each conductive contact disposed in the auxiliary sealing element can connect to a distinct protector element, such as a current interrupt device (CID) or a rupture disk. The protector element at one tab can differ from the protector element at the other tab. Electrical current can flow through the tab connected to the cathode to the tab connected to the anode via the two protector elements. In this way, the battery cell construction can remove the restriction in the number of materials allowed to be used for the housing. The architecture of the battery cell can also simplify bonding of wires to the tabs corresponding to the positive and negative terminals. The inclusion of differing protector element can incorporate safety redundancies in the event that either protector element fails during a breakdown event within the battery cell.

By creating a cap at the same lateral end with two flat tabs for the positive and negative terminals, there may be more flat area available for bonding, thereby improving the pack assembly process by making it easier to bond the wire to each tab. In addition, having both tabs for the positive and the negative terminals on one end of the battery cell can eliminate wire bonding to one side of the battery pack and welding of a tab to another side of the battery cell (e.g., the bottom end or the crimped region). In this manner, a terminal or an electrode tab along the bottom of the battery cell can be eliminated from the structure. Additionally, the amount of flat bond pad area along the top end of the battery cell can be enlarged, thus improving the pack assembly process by making it easier to bond the wire to each tab. Furthermore, the flexibility of casing material selection can allow for the casing to include non-conductive material, thus permitting direct contact between the battery cell and a thermoelectric plate to cool the battery cell at a faster rate and elongating the lifespan of the battery cell.

Referring to FIG. 1, among others, depicted is a cross-sectional view of a battery cell 100 for a battery pack in an electric vehicle. The battery cell 100 can be a lithium-air battery cell, a lithium ion battery cell, a nickel-zinc battery cell, a zinc-bromine battery cell, a zinc-cerium battery cell, a sodium-sulfur battery cell, a molten salt battery cell, a nickel-cadmium battery cell, or a nickel-metal hydride battery cell, among others. The battery cell 100 can include a housing 105. The housing 105 can be included or contained in a battery pack (e.g., a battery array or battery module) installed a chassis of an electric vehicle. The housing 105 can have the shape of a cylindrical casing or cylindrical cell with a circular, ovular, or elliptical base, as depicted in the example of the battery cell of FIG. 1. A height of the housing 105 can be greater than a width of the housing 105. For example, the housing 105 can have a length (or height) of 65-75 mm and a maximum width (or diameter for circular examples) of 17-25 mm. In some examples the width or diameter of the housing 105 can be greater than the length (e.g., height) of the housing 105. The housing 105 can be formed from a prismatic casing with a polygonal base, such as a triangle, square, a rectangular, a pentagon, or a hexagon, for example. A height of such a prismatic cell housing 105 can be less than a length or a width of the base of the housing 105. The battery cell can be a cylindrical cell 21 mm in diameter and 70 mm in height. Other shapes and sizes are possible, such as a rectangular cells or rectangular cells with rounded edges, of cells between 17-25 mm in diameter or width, and 65-75 mm in length or height.

The housing 105 of the battery cell 100 can include at least one electrically or thermally conductive material, or combinations thereof. The electrically conductive material can also be a thermally conductive material. The electrically conductive material for the housing 105 of the battery cell 100 can include a metallic material, such as aluminum, an aluminum alloy with copper, silicon, tin, magnesium, manganese or zinc (e.g., of the aluminum 5000 or 6000 series), iron, an iron-carbon alloy (e.g., steel), silver, nickel, copper, and a copper alloy, among others. The electrically conductive material and thermally conductive material for the housing 105 of the battery cell 100 can include a conductive polymer. To evacuate heat from inside the battery cell 100, the housing 105 can be thermally coupled to a thermoelectric heat pump (e.g., a cooling plate) via an electrically insulative layer. The housing 105 can include an electrically insulative material. The electrically insulative material can be a thermally conductive material. The electrically insulative and thermally conductive material for the housing 105 of the battery cell 100 can include a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others. To evacuate heat from inside the battery cell 100, the housing 105 can be thermally coupled to a thermoelectric heat pump (e.g., a cooling plate). The housing 105 can be directly thermally coupled to the thermoelectric heat pump without an addition of an intermediary electrically insulative layer.

The housing 105 of the battery cell 100 can include a body region 110, a neck region 115, and a head region 120. The body region 110, the neck region 115, and the head region 120 can be defined along one axis of the housing 105. In the example depicted in FIG. 1, among others, the body region 110, the neck region 115, and the head region 120 can be defined along a vertical (or longitudinal) axis of cylindrical casing forming the housing 105. The body region 110, the neck region 115, and the head region 120 can be defined by an inner surface and an outer surface of the housing 105. The body region 110 can be at one end of the housing 105 (e.g., a bottom end as depicted in FIG. 1). The end of the body region 110 can encapsulate or cover the corresponding end of the housing 105. The head region 120 can be at an opposite end of the housing 105 (e.g., a top end as depicted in FIG. 1). The neck region 115 can be between the body region 110 and the head region 120.

The body region 110 can house, define, or include an opening, space, or container 125 to store or hold electrochemical cells. The container 125 can correspond to the body region 110 of the housing 105. The container 125 can be defined by an inner surface of the body region 110 of the housing 105. The container 125 can be a casing separate from the housing 105 for holding the electrochemical cells of the battery cell 100. The container 125 can hold, house, store, or otherwise include electrodes and electrolytes. The container 125 can include a cylindrical casing with a circular, ovular, or elliptical base. A height of the cylindrical casing can be greater than a diameter of the cylindrical casing. The diameter of the cylindrical case can be greater than the height of the cylindrical casing. The container 125 can be a prismatic casing with a polygonal base, such as a triangle, square, a rectangular, a pentagon, or a hexagon, for example. A height of the prismatic cell for the container 125 can be less than a length or a width of the base of the prismatic cell. The height of the prismatic cell for the container 125 can be greater than the length or the width of the base of the prismatic cell. The container 125 can also form or define a hollowing or hollow area along at least one axis of the housing 105 for the battery cell 100.

The container 125 can include one or more separators 130. Each separator 130 can include a permeable membrane separating the cathode 135 and the anode 140. The one or more separators 130 can be formed of, contain, or include the electrolyte. The electrolyte can include any electrically conductive solution, dissociating into ions (e.g., cations and anions). For an lithium-ion battery cell, for example, the electrolyte of the one or more separators 130 can include a liquid electrolyte, such as lithium bisoxalatoborate ($LiBC_4O_8$ or LiBOB salt), lithium perchlorate ($LiClO_4$), lithium hexafluorophosphate ($LiPF_6$), and lithium trifluoromethanesulfonate ($LiCF_3SO_3$). The electrolyte of the separator 130 can include a polymer electrolyte, such as polyethylene oxide (PEO), polyacrylonitrile (PAN), poly (methyl methacrylate) (PMMA) (also referred to as acrylic glass), or polyvinylidene fluoride (PVdF). The electrolyte of the one or more separators 130 can include a solid-state electrolyte, such as lithium sulfide ($Li_2S$), magnesium, sodium, and ceramic materials (e.g., beta-alumna). The one or more separators 130 can be formed of, contain, or include a solvent to hold the electrolyte, such as dimethyl carbonate ($C_3H_6O_3$), diethyl carbonate ($C_5H_{10}O$), propylene carbonate ($C_4H_6O_3$), methyl propylene carbonate ($C_5H_{10}O_3$), and tetrahydrofuran ($C_4H_8O$), among others.

The container 125 can include one or more cathodes 135 and one or more anodes 140. The cathodes 135 and the anodes 140 can be generally referred to as electrodes. Each cathode 135 and anode 140 can be separated or divided from each other by one of the separators 130. The one or more separators 130, the one or more cathodes 135, and the one or more anodes 140 can be arranged in a stack formation. The cathodes 135 can include any substance through which electrical current flows out of the electrolyte in the separators 130. The anodes 140 can include any substance through which electrical current flows into the electrolyte in the separators 130. For a lithium-ion cell, for example, the one or more cathodes 135 can include a lithium-metal oxide (e.g., lithium cobalt oxide ($LiCoO_2$) and lithium manganese oxide ($LiMn_2O_4$)), a vanadium oxide, (e.g., VO) or an olivine (e.g., $LiFePO_4$), among others. The one or more anodes 140 can include carbonaceous materials (e.g., graphites, carbon fibers, active carbons, and carbon blacks), lithium titanium oxide ($Li_4Ti_5O_{12}$), a metal alloy (e.g., using aluminum, bismuth, antimony, zinc, magnesium, copper, iron, nickel, etc.) or a composite including metal and carbonaceous materials.

The body region 110 can also include a center support 145 defined by the container 125. The center support 145 can be included or inserted into the hollowing defined by the container 125. The hollowing can be defined by the container 125 can be or include the center support 145. The center support in the hollowing can be any structure or member to wrap around the one or more separators 130, the one or more cathodes 135, and the one or more anodes 140 in stack formation. The center support 145 can include an electrically insulative material, and the center support 145 can function neither as the positive terminal nor the negative terminal for the battery cell 100. The container 125 can also lack or not include the center support 145, and the container 125 along with the one or more separators 130, the one or more cathodes 135, and the one or more anodes 140 can span the full dimensions of the body region 110.

The battery cell 100 can include a first bonding element 160 and a second bonding element 165 for forming the polarity terminals of the battery cell 100. Each bonding element 160 and 165 can extend from the container 125 of the body region 110 through the neck region 115 to the head region 120 of the battery cell 100. Each bonding element 160 and 165 can include an electrically conductive wire to form the corresponding polarity terminal of the battery cell 100. Each bonding element 160 and 165 can be bonded, joined, attached, soldered, welded, connected, or otherwise electrically coupled to at least one of the cathodes 135 and anodes 140 housed in the body region 110. The first bonding element 160 can correspond to a positive terminal for the battery cell 100, and can electrically couple the positive terminal to one of the cathodes 135 housed in the body region 110. The second bonding element 165 can correspond to a negative terminal for the battery cell 100, and can be electrically couple the negative terminal for the battery cell 100 to one of the anodes 140 housed in the body region 110. Conversely, the first bonding element 160 can correspond to a negative terminal for the battery cell 100, and can electrically couple the negative terminal to one of the anodes 140 housed in the body region 110. The second bonding element 165 can correspond to a positive terminal for the battery cell 100, and can be electrically couple the positive terminal for the battery cell 100 to one of the cathodes 135 housed in the body region 110. The first bonding element 160 and the second bonding element 165 can be bonded, joined, attached, soldered, welded, or otherwise connected to the components within the head region 120 detailed below in conjunction with FIG. 2, among others.

The first bonding element 160 and the second bonding element 165 can couple a corresponding electrode (e.g., cathode 135 or anode 140) housed in the body region 110 to an electrical power distribution system of the electrical vehicle. The electrical power distribution system can include a busbar or current collector for each electrical polarity or a current collector for each electrical polarity. Each bonding element 160 and 165 can couple the corresponding electrode housed in the body region 110 to the corresponding busbar or a current collector for the electrical vehicle. The first bonding element 160 can correspond to the positive terminal for the battery cell 100, and can electrically couple one of the cathodes 135 housed in the body region 110 to a positive polarity busbar or a positive polarity current collector. The second bonding element 165 can correspond to a negative terminal for the battery cell 100, and can be electrically couple one of the anodes 140 housed in the body region 110 to a negative polarity busbar or a negative polarity current collector. Conversely, the first bonding element 160 can correspond to a negative terminal for the battery cell 100, and can electrically couple one of the anodes 140 housed in the body region 110 to a negative polarity busbar or a negative polarity current collector. The second bonding element 165 can correspond to a positive terminal for the battery cell 100, and can be electrically couple one of the cathodes 135 housed in the body region 110 to a positive polarity busbar or a positive polarity current collector.

The neck region 115 (sometimes referred to herein as a "crimped region") can include any part of the housing 105 separating the body region 110 from the head region 120. The neck region 115 can include or be defined by a bend or indentation 150 protruding between the body region 110 and the head region 120. The indentation 150 of the neck region 115 can be formed by crimping, squeezing, or applying any pressure on an outer surface of the housing 105 along one axis. The neck region 115 can have a width less than a width of the body region 110 and a width of the head region 120. For example, the width of the neck region 115 can be 15-20 mm, the width of the body region 110 can be 15-27 mm, and the width of the head region 120 can be 15-27 mm. The width can correspond to a shortest dimension along an inner surface of the housing 105 within the neck region 115. The width can correspond to a width of a rectangular or polygonal lateral area of the neck region 115. The width can correspond to a diameter of a circular or elliptical lateral area of the neck region 115. The lateral area of the neck region 115 can also be less than a lateral area of the head region 120 and a lateral area of the body region 110. The width of the head region 120 can be less than the width of the body region 110 but greater than the width of the neck region 115. The lateral area of the head region 120 can be less than the lateral area of the body region 110 but greater than the lateral area of the neck region 115.

The head region 120 can correspond to a part of the housing 105 for the battery cell 100 from the neck region 115 to one end of the housing 105 (e.g., the top end as depicted in FIG. 1). The head region 120 can correspond to the part of the housing 105 from one end of the indentation 150 of the neck region 115 to the top end of the housing 105. The end of the housing 105 can be an opening 155 defined by an inner surface of the head region 120. The end of the housing 105 can protrude inward forming the opening 155 to hold the components housed within the head region 120, among others. The width of the opening 155 can be less than the width of the neck region 115. The width of the opening 155 can be substantially (e.g., within 10%) equal to the width of the neck region 115.

The head region 120 can include a first sealing element 170 to hold or seat a first conductive contact 175 and a second conductive contact 180. The first sealing element 170 can define a first slot 185 and a second slot 190. The first conductive contact 175 can be disposed or arranged in the first slot 185. The first conductive contact 175 can be connected or otherwise be electrically coupled with the electrode 135 via the first bonding element 160. The first conductive contact 175 can form a first polarity terminal for the battery cell 100. A portion of the first conductive contact 175 can protrude or extend out of the housing 105 beyond the opening 155 defined by the head region 120. The second conductive contact 180 can be disposed or arranged in the second slot 190. The second conductive contact 180 can be connected or otherwise be electrically coupled with the electrode 140 via the second bonding element 165. The second conductive contact 180 can form a second polarity terminal for the battery cell 100. A portion of the second conductive contact 180 can protrude or extend out of the housing 105 beyond the opening 155 defined by the head region 120. Additional details of the first sealing element 170, the first conductive contact 175, the second conductive contact 180, the first slot 185, and the second slot 190 are provided below in conjunction with FIG. 2, among others.

Figure 2:
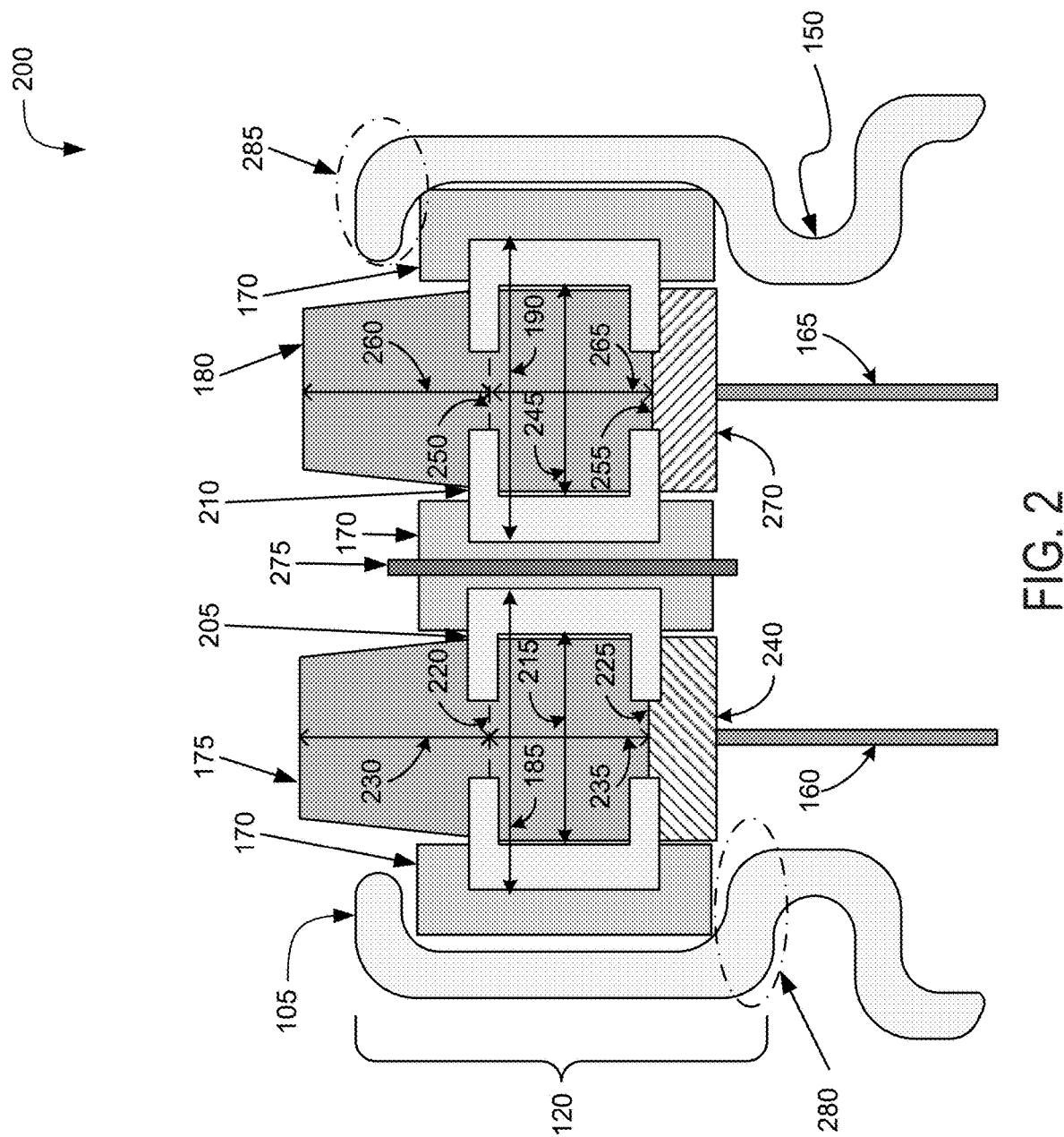
FIG. 2 is a block diagram depicting a cross-sectional view of an example of a head region of a battery cell for a battery pack in an electric vehicle.

Referring to FIG. 2, among others, depicted is a cross-sectional view 200 of the head region 120 of the battery cell 100 for the battery pack in the electric vehicle. The head region 120 can house, contain, store, hold, or otherwise include the first sealing element 170, the first conductive contact 175, the second conductive contact 180, a second sealing element 205, a third sealing element 210, a first protector element 240, a second protector element 270, and a divider element 275, among other components. The head region 120 can pass or expose at least a portion of the first conductive contact 175 corresponding to the first polarity terminal for the battery cell 100. The head region 120 can also pass or expose at least a portion of the second conductive contact 180 corresponding to the second polarity terminal for the battery cell 100.

The first sealing element 170 (sometimes referred to as a primary gasket) can form a seal across an inner surface of head region 120 of the housing 105 to retain the materials and components contained within the housing 105. The first sealing element 170 can house, retain, hold, secure, seal, or otherwise include the first conductive contact 175, the second conductive contact 180, the second sealing element 205, the third sealing element 210, and the divider element 275, among others. The first sealing element 170 can also house, retain, hold, secure, seal, or otherwise include first protector element 240 and the second protector element 270. The first sealing element 170 can be a gasket, a washer, an O-ring, a cap, a fitting, a hose coupling, or any other component to house, retain, hold, secure, or seal the components retained therein. The first sealing element 170 can form the seal across the opening 155 formed by the open end of the head region 120 of the housing 105 to retain the first conductive contact 175, the second conductive contact 180, the second sealing element 205, the third sealing element 210, the divider element 275, the first protector element 240, and the second protector element 270, among others. The seal formed by the first sealing element 170 can include any type of mechanical seal, such as a hermetic seal, an induction seal, a hydrostatic seal, a hydrodynamic seal, and a bonded seal, among others. The first sealing element 170 can include electrically insulative material to electrically isolate the first conductive contact 175 and the second conductive contact 180 from each other. The electrically insulative material of the first sealing element 170 can include a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others. The electrically insulative material of the first sealing element 170 can also electrically isolate the first conductive contact 175, the second conductive contact 180, and the divider element 275 from one another. The first sealing element 170 can include thermally conductive material to allow heat to evacuate from the body region 110.

The first sealing element 170 can be positioned on, adjacent or proximate to (e.g., within 1 mm of) or be at least partially supported by a shoulder portion 280 of the neck region 115 of the housing 105. The indentation 150 can define the shoulder portion 280 for supporting the first sealing element 170. The shoulder portion 280 can contact at least part of the first sealing element 170 to fix or maintain a position of the first sealing element 170. The shoulder portion 280 can correspond to at least a portion of one surface of the indentation 150 of the neck region 115. For example, as depicted in FIGS. 1 and 2, among others, the first sealing element 170 can be situated on a top surface of the indentation 150 of the neck region 115. The shoulder portion 280 can be an integral element of the housing 105 formed by a crimping process. The shoulder portion 280 can be partially or fully in contact with the first sealing element 170 in an assembled position. The shoulder portion 280 can also be distanced from, separated from, or otherwise not in direct contact with the first sealing element 170. The first sealing element 170 can be retained or at least partially held in the head region 120 of the housing 105 by a part of a lip portion 285. The lip portion 285 can correspond to any portion of the head region 120 of the housing 105 at the opening 155 protruding inward. For example, as depicted in FIG. 2, the first sealing element 170 can be held in the housing 105 by the lip portion 285 and supported by the shoulder portion 280. An outer surface of the first sealing element 170 can be at least in partial contact with the inner surface of the housing 105 in the head region 120. The outer surface of the first sealing element 170 can be in contact with at least the lip portion 285 of the head region 120. The first sealing element 170 can be retained in the head region 120 of the housing 105 without the lip portion 285. The first sealing element 170 can reside on top of the head region 120 spanning the opening 155. The length and width (or diameters in circular examples) of the first sealing element 170 can be 14-24 mm. The height (or thickness) of the first sealing element 170 can be 0.5-0.9 mm.

The first sealing element 170 can house, retain, support, or otherwise include the divider element 275. The divider element 275 can include any electrically conductive material, such as a metallic material. The metallic material of the divider element 275 can include aluminum, an aluminum alloy with copper, silicon, tin, magnesium, manganese or zinc (e.g., of the aluminum 5000 or 6000 series), iron, an iron-carbon alloy (e.g., steel), silver, nickel, copper, and a copper alloy, among others. The divider element 275 can include an electrically insulative material, such a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others. The divider element 275 can be of a different electrically insulative material from the first sealing element 170. The divider element 275 can partially or fully span the width of the opening 155 defined by the lateral end of the head region 120 of the housing 105. A length of the divider element 275 can range from 15-30 mm. The divider element 275 can partially or fully span a height of the first sealing element 170. The height of the divider element 275 can be greater than the height of the first sealing element 170.

The divider element 275 can delineate a physical separation between the first slot 185 and the second slot 190. The divider element 275 can maintain or preserve the separation between the first slot 185 and the second slot 190, and the components included in each of the first slot 185 and the second slot 190. The divider element 275 can separate the first conductive contact 175 and the second conductive contact 180 from each other. The divider element 275 can also separate the first protector element 240 and the second protector element 270 from each other. A first portion and a second portion of the first sealing element 170 can be delineated by the divider element 275. The first sealing element 170 can have the first portion defining the first slot 185. The first sealing element 170 can also have the second portion defining the second slot 190. The first portion and the second portion of the first sealing element 170 can include an electrically insulative material. The electrically insulative material of the first portion and the second portion of the first sealing element 170 can include a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others.

The first sealing element 170 can define the first slot 185 for the first polarity terminal of the battery cell 100 and the second slot 190 for the second polarity terminal of the battery cell 100. In this manner, both the positive terminal and the negative terminal can be along one side of the housing 105 of the battery cell 100 through the opening 155. The first slot 185 can be a hole, aperture, or any other spacing extending from one end of the first sealing element 170 (e.g., a top lateral end toward the opening 155) to the other end of the first sealing element 170 (e.g., a bottom lateral end toward the neck region 115). The first slot 185 can be defined by a volume within an inner longitudinal surface of the first sealing element 170. The first slot 185 can be formed through the first sealing element 170. The first slot 185 can be located away from the center of the first sealing element 170 as delineated by the divider element 275. The first slot 185 can include, function, or act as an outlet for one of the polarity terminals for the battery cell 100. The shape of the first slot 185 can be cylindrical with a circular, ovular, or elliptical base or prismatic with a polygonal base, such as a triangle, square, a rectangular, a pentagon, or a hexagon. For example, the first slot 185 can have a length (or height) of 0.5-10 mm and a maximum width (or diameter for circular examples) of 3-13 mm. The second slot 190 can be a hole, aperture, or any other spacing extending from one end of the first sealing element 170 (e.g., a top lateral end toward the opening 155) to the other end of the first sealing element 170 (e.g., a bottom lateral end toward the neck region 115). The second slot 190 can be defined by a volume within an inner longitudinal surface of the first sealing element 170. The second slot 190 can be formed through the first sealing element 170. The second slot 190 can be located away from the center of the first sealing element 170 as delineated by the divider element 275. The second slot 190 can include, function, or act as an outlet for one of the polarity terminals for the battery cell 100. The shape of the second slot 190 can be cylindrical with a circular, ovular, or elliptical base or prismatic with a polygonal base, such as a triangle, square, a rectangular, a pentagon, or a hexagon. For example, the second slot 190 can have a length (or height) of 0.5-10 mm and a maximum width (or diameter for circular examples) of 3-13 mm.

The second sealing element 205 (sometimes referred to as a first auxiliary gasket) can be disposed, fixed, arranged, positioned, seated, or otherwise included in the first sealing element 170. The second sealing element 205 can form a seal across the inner longitudinal surface of the first slot 185 defined by the first sealing element 170 to retain the materials and components contained within the first slot 185. The second sealing element 205 can house, retain, hold, secure, seal, seat, or otherwise include the first conductive contact 175 and the first protector element 240, among other components therein. The second sealing element 205 can be a gasket, a washer, an O-ring, a cap, a fitting, a hose coupling, or any other component to house, retain, hold, secure, or seal the components retained therein. The seal formed by the second sealing element 205 can include any type of mechanical seal, such as a hermetic seal, an induction seal, a hydrostatic seal, a hydrodynamic seal, and a bonded seal, among others. The second sealing element 205 can include electrically insulative material to electrically isolate the first conductive contact 175 and the second conductive contact 180 from each other. The electrically insulative material of the second sealing element 205 can include a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others. The electrically insulative material of the second sealing element 205 can also electrically isolate the first conductive contact 175, the second conductive contact 180, and the divider element 275 from one another. The first sealing element 170 can include thermally conductive material to allow heat to evacuate from the body region 110.

The second sealing element 205 can be positioned on, adjacent or proximate to (e.g., within 1 mm of), or at least be partially supported by the inner longitudinal surface of the first slot 185 defined by the first sealing element 170. An outer longitudinal surface of the second sealing element 205 can be partially or fully flush or in contact with the inner longitudinal surface of the first slot 185 defined by the first sealing element 170. The second sealing element 205 can be at least partially supported by a bottom inner lateral surface of the first slot 185 defined by the first sealing element 170 to fix or maintain a position of the second sealing element 205 within. The bottom inner lateral surface of the first slot 185 can protrude inward into the first slot 185 defined by the first sealing element 170. The second sealing element 205 can also be at least partially held in the first slot 185 defined by the first sealing element 170 by a top inner lateral surface of the first slot 185 defined by the first sealing element 170. The top inner lateral surface of the first slot 185 can protrude inward into the first slot 185 defined by the first sealing element 170.

The second sealing element 205 can define a first opening 215 to retain, seat, position, or otherwise include the first conductive contact 175 corresponding to the first polarity terminal. In this manner, both the positive terminal and the negative terminal can be along one side of the housing 105 of the battery cell 100. The first opening 215 can be a hole, aperture, or any other spacing extending from one end of the second sealing element 205 (e.g., a top lateral end toward the opening 155) to the other end of the second sealing element 205 (e.g., a bottom lateral end toward the neck region 115). The first opening 215 can also be a hole, aperture, or any other spacing extending from one end of the first slot 185 defined by the first sealing element 170 (e.g., a top lateral end toward the opening 155) to the other end of the first slot 185 defined by the first sealing element 170 (e.g., a bottom lateral end toward the neck region 115). The first opening 215 can be defined by a volume within an inner longitudinal surface of the second sealing element 205. The first opening 215 can be defined by the second sealing element 205 to have a first lateral end 220 (e.g., a top lateral end toward the opening 155) and a second lateral end 225 (e.g., a bottom lateral end toward the neck region 115) of the second sealing element 205. The first opening 215 can be formed through the first sealing element 170 or the second sealing element 205. The first opening 215 can be located away from the center of the first sealing element 170 as delineated by the divider element 275. The first opening 215 can include, function, or act as an outlet for one of the polarity terminals for the battery cell 100. The shape of the first opening 215 can be cylindrical with a circular, ovular, or elliptical base or prismatic with a polygonal base, such as a triangle, square, a rectangular, a pentagon, or a hexagon. For example, first opening 215 can have a length (or height) of 0.5-10 mm and a maximum width (or diameter for circular examples) of 3-13 mm. In some examples the diameter can be 5-8 mm.

The first conductive contact 175 can be partially or fully disposed, fixed, arranged, positioned, seated, or otherwise included in the first opening 215 defined by the second sealing element 205. The first conductive contact 175 can be positioned on, adjacent or proximate to (e.g., within 1 mm of), or at least be partially supported by the inner longitudinal surface of the first opening 215 defined by the second sealing element 205. An outer longitudinal surface of the first conductive contact 175 can be partially or fully flush or in contact with the inner longitudinal surface of the first opening 215 defined by the second sealing element 205. The first conductive contact 175 can be at least partially supported by a bottom inner lateral surface of the first opening 215 defined by second sealing element 205 to fix or maintain a position of the first conductive contact 175 within the second sealing element 205. The bottom inner lateral surface of the first opening 215 can protrude inward into the first opening 215 defined by the second sealing element 205 toward the second lateral end 225. The first conductive contact 175 can also be at least partially held in the first opening 215 defined by the second sealing element 205 by a top inner lateral surface of the first opening 215 defined by the second sealing element 205. The top inner lateral surface of the first opening 215 can protrude inward into the first opening 215 defined by the second sealing element 205 toward the first lateral end 220.

The first conductive contact 175 can include any electrically conductive material, such as aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. A shape of the first conductive contact 175 can correspond or match the shape of the first opening 215 defined by the second sealing element 205. The shape of the first conductive contact 175 can be a triangular, rectangular, pentagonal, elliptical, and circular, among other shapes. The dimensions and shape of the first conductive contact 175 can be the same as dimensions and shape of the second conductive contact 180. The dimensions and shape of the first conductive contact 175 can differ as the dimensions and the shape of the second conductive contact 180. For example, the first conductive contact 175 can be a cylinder with an elliptical base, whereas the second conductive contact 180 can be a prism with a rectangular base.

The first conductive contact 175 can define or include a protrusion element 230 and a body 235. The protrusion element 230 (sometimes referred to as a tabletop) can correspond to a portion of the first conductive contact 175 extending beyond the first lateral end 220 of the first opening 215 defined by the second sealing element 205. The protrusion element 230 can extend or protrude from the first lateral end 220 of the second sealing element 205 beyond the opening 155 defined by the head region 120 of the housing 105. A height of the protrusion element 230 can be 0.3-2.0 mm. A width or length (or a diameter for cylindrical examples) of the protrusion element 230 can be 3-13 mm. The body 235 can correspond to a portion of the first conductive contact 175 below the first lateral end 220 of the first opening 215. The body 235 can correspond to a portion of the first conductive contact 175 between the first lateral end 220 and the second lateral end 225 of the first opening 215 defined by the second sealing element 205. The protrusion element 230 and the body 235 can be integral portions of the first conductive contact 175. When forming the integral portions of the first conductive contact 175, the protrusion element 230 and the body 235 can include the same electrically conductive material. The protrusion element 230 and the body 235 can form differing constituent portions of the first conductive contact 175. When forming different, constituent portions of the first conductive contact 175, the protrusion element 230 and the body 235 can include different electrically conductive materials.

The first conductive contact 175 can define, correspond to, or otherwise include the first polarity terminal for the battery cell 100. The first conductive contact 175 can function as a positive polarity terminal or a negative polarity terminal. The first conductive contact 175 can have a polarity opposite of the second conductive contact 180. The first conductive contact 175 can be bonded, joined, attached, soldered, welded, connected, or otherwise be electrically coupled to the first bonding element 160. The first conductive contact 175 can electrically couple with the first bonding element 160 connected to a first electrode (e.g., one of the cathodes 135 or one of the anodes 140). The first bonding element 160 can be connected to one of the cathodes 135 housed in the body region 110 of the battery cell 100. The first conductive contact 175 electrically coupled to the cathode 135 via the first bonding element 160 can be the positive polarity terminal. The first bonding element 160 can be connected to one of the anodes 140 housed in the body region 110 of the battery cell 100. The first conductive contact 175 electrically coupled to the anode 140 via the first bonding element 160 can be the negative polarity terminal. The first conductive contact 175 can electrically couple with the vehicle electrical distribution system (e.g., a busbar or a current collector) via another bonding element from the vehicle electrical distribution system. The bonding element from the vehicle electrical distribution system can be bonded, welded, attached, connected, or otherwise electrically coupled to an area provided by a lateral end (e.g., a top lateral surface) of the first conductive contact 175. The connection with the electrical distribution system of the electrical vehicle is detailed below in conjunction with FIGS. 4-6, among others.

The first protector element 240 can be disposed, fixed, arranged, positioned, or otherwise included between the second sealing element 205 and the first electrode (e.g., one of the cathodes 135 or one of the anodes 140) connected to first bonding element 160. The first protector element 240 can be at least partially disposed, fixed, arranged, positioned, seated, or otherwise included in the first opening 215 defined by the second sealing element 205. When at least partially disposed within the first opening 215, the bottom lateral surface of the first opening 215 defined by the third sealing element 210 can retain, hold, or support the first protector element 240. A lateral end of the first protector element 240 (e.g., a top lateral surface) can be partially or fully flush with a lateral end of the first conductive contact 175 (e.g., a bottom lateral surface) at the second lateral end 225 of the first opening 215 defined by the second sealing element 205.

The first protector element 240 can also be positioned separated from the first conductive contact 175 and the second sealing element 205 (e.g., by 0.1-5 mm). The first protector element 240 can be partially situated below and away from the second sealing element 205 in the head region 120, the neck region 115, or the body region 110. The first protector element 240 can be positioned or situated above a lateral end (e.g., a top lateral surface) of the container 125 included in the body region 110 of the housing 105. The first protector element 240 can be bonded, joined, attached, soldered, welded, connected, or be coupled to either the first bonding element 160 or the first conductive contact 175, or both the first bonding element 160 and the first conductive contact 175. The first protector element 240 can be electrically coupled the first bonding element 160 and the first conductive contact 175 to form a series connection from the first electrode to the first conductive contact 175.

The first protector element 240 can react to a first failure condition (sometimes referred to a failure event or a catastrophic failure) that occurs within the body region 110 of the housing 105. The first failure condition can be related to current, voltage, temperature, or pressure originating from within the body region 110 of the housing 105 for the battery cell 100. For example, the first failure condition can include an excessively high current or over-voltage event (e.g., above 4.2 volts originating from the cathodes 135 and anodes 140), resulting in lithium plating in the anodes 140 of a lithium-ion battery cell. The first failure condition can also include an excessively low current or under-voltage event (e.g., below 2 volts discharged from the cathodes 135 and anodes 140), leading to chemical breakdown of the cathodes 135 and anodes 140. The first failure condition can include a dramatic increase in temperature and pressure within the body region 110 from a thermal runaway (e.g., temperature of more than 110° C. or a pressure of more than 1,000 kPa).

The first protector element 240 can be of a first mechanism type to react to the first failure condition occurring within the body region 110 of the housing 105. The first protector element 240 can, for example, include a current interrupt device (CID), an electrical fuse, a thermal fuse, a rupture disk, or a printed circuit board (PCB) protection board, among others. In response to an occurrence of the first failure condition, the first protector element 240 can react to the first failure condition. The first protector element 240 can include a CID initially electrically coupled between the first conductive contact 175 and the first bonding element 160 in series. In response to the occurrence of the first failure condition (e.g., excess voltage over 4.0 volts or pressure above 1,000 kPa), the CID of the first protector element 240 can initially electrically decouple the first conductive contact 175 from the first electrode connected to the first bonding element 160. The first protector element 240 can include an electrical fuse (e.g., a polymeric positive temperature coefficient device) electrically coupled between the first conductive contact 175 and the first bonding element 160 in series. In response to the occurrence of the first failure condition (e.g., excess voltage over 4.3 volts), the electrical fuse of the first protector element 240 can electrically decouple the first conductive contact 175 from the first electrode connected to the first bonding element 160. The first protector element 240 can include a thermal fuse initially electrically coupled between the first conductive contact 175 and the first bonding element 160 in series. In response to the occurrence of the first failure condition (e.g., temperatures above 70° C.), the thermal fuse can electrically decouple the first conductive contact 175 from the first electrode connected to the first bonding element 160. The first protector element 240 can include a rupture disk initially connected between the first conductive contact 175 and the first bonding element 160 in series. In response to the occurrence of the first failure condition (e.g., pressure above 2,000 kPa), the rupture disk of the first protector element 240 can burst to vent pressure from within the body region 110 of the housing 105, causing the electrical decoupling of the first conductive contact 175 from the first bonding element 160. The first protector element 240 can include a PCB protection board initially electrically coupled to the first conductive contact 175 and the first bonding element 160. In response to the occurrence of the first failure condition (e.g., excess voltage over 4.0 volts or below 2.3 volts), the PCB protection board can electrically decouple the first conductive contact 175 from the first electrode connected to the first bonding element 160.

The third sealing element 210 (sometimes referred to as a second auxiliary gasket) can be disposed, fixed, arranged, positioned, seated, or otherwise included in the first sealing element 170. The third sealing element 210 can form a seal across the inner longitudinal surface of the second slot 190 defined by the first sealing element 170 to retain the materials and components contained within the second slot 190. The third sealing element 210 can house, retain, hold, secure, seal, seat, or otherwise include the second conductive contact 180 and the second protector element 270, among other components therein. The third sealing element 210 can be a gasket, a washer, an O-ring, a cap, a fitting, a hose coupling, or any other component to house, retain, hold, secure, or seal the components retained therein. The seal formed by the third sealing element 210 can include any type of mechanical seal, such as a hermetic seal, an induction seal, a hydrostatic seal, a hydrodynamic seal, and a bonded seal, among others. The third sealing element 210 can include electrically insulative material to electrically isolate the first conductive contact 175 and the second conductive contact 180 from each other. The electrically insulative material of the third sealing element 210 can include a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others. The electrically insulative material of the third sealing element 210 can also electrically isolate the first conductive contact 175, the second conductive contact 180, and the divider element 275 from one another. The first sealing element 170 can include thermally conductive material to allow heat to evacuate from the body region 110.

The third sealing element 210 can be positioned on, adjacent or proximate to (e.g., within 1 mm of), or at least be partially supported by the inner longitudinal surface of the second slot 190 defined by the first sealing element 170. An outer longitudinal surface of the third sealing element 210 can be partially or fully flush or in contact with the inner longitudinal surface of the second slot 190 defined by the first sealing element 170. The third sealing element 210 can be at least partially supported by a bottom inner lateral surface of the second slot 190 defined by the first sealing element 170 to fix or maintain a position of the third sealing element 210 within. The bottom inner lateral surface of the second slot 190 can protrude inward into the second slot 190 defined by the first sealing element 170. The third sealing element 210 can also be at least partially held in the second slot 190 defined by the first sealing element 170 by a top inner lateral surface of the second slot 190 defined by the first sealing element 170. The top inner lateral surface of the second slot 190 can protrude inward into the second slot 190 defined by the first sealing element 170.

The third sealing element 210 can define a second opening 245 to retain, seat, position, or otherwise include the first conductive contact 175 corresponding to the first polarity terminal. In this manner, both the positive terminal and the negative terminal can be along one side of the housing 105 of the battery cell 100. The second opening 245 can be a hole, aperture, or any other spacing extending from one end of the third sealing element 210 (e.g., a top lateral end toward the opening 155) to the other end of the third sealing element 210 (e.g., a bottom lateral end toward the neck region 115). The second opening 245 can also be a hole, aperture, or any other spacing extending from one end of the second slot 190 defined by the first sealing element 170 (e.g., a top lateral end toward the opening 155) to the other end of the second slot 190 defined by the first sealing element 170 (e.g., a bottom lateral end toward the neck region 115). The second opening 245 can be defined by a volume within an inner longitudinal surface of the third sealing element 210. The second opening 245 can be defined by the third sealing element 210 to have a first lateral end 250 (e.g., a top lateral end toward the opening 155) and a second lateral end 255 (e.g., a bottom lateral end toward the neck region 115) of the third sealing element 210. The first lateral end 250 of the second opening 245 can be substantially parallel (e.g., within 10 degrees) on substantially the same plane (e.g., within 10 mm) as the first lateral end 220 of the first opening 215. The second lateral end 255 of the second opening 245 can be substantially parallel (e.g., within 10 degrees) on substantially the same plane (e.g., within 10 mm) as the second lateral end 225 of the first opening 215. The second opening 245 can be formed through the first sealing element 170 or the third sealing element 210. The second opening 245 can be located away from the center of the first sealing element 170 as delineated by the divider element 275. The second opening 245 can include, function, or act as an outlet for one of the polarity terminals for the battery cell 100. The shape of the second opening 245 can be cylindrical with a circular, ovular, or elliptical base or prismatic with a polygonal base, such as a triangle, square, a rectangular, a pentagon, or a hexagon. For example, second opening 245 can have a length (or height) of 0.5-10 mm and a maximum width (or diameter for circular examples) of 3-13 mm. In some examples the diameter can be 5-8 mm.

The second conductive contact 180 can be partially or fully disposed, fixed, arranged, positioned, seated, or otherwise included in the second opening 245 defined by the third sealing element 210. The second conductive contact 180 can be positioned on, adjacent or proximate to (e.g., within 1 mm of), or at least be partially supported by the inner longitudinal surface of the second opening 245 defined by the third sealing element 210. An outer longitudinal surface of the second conductive contact 180 can be partially or fully flush or in contact with the inner longitudinal surface of the second opening 245 defined by the third sealing element 210. The second conductive contact 180 can be at least partially supported by a bottom inner lateral surface of the second opening 245 defined by third sealing element 210 to fix or maintain a position of the second conductive contact 180 within the third sealing element 210. The bottom inner lateral surface of the second opening 245 can protrude inward into the second opening 245 defined by the third sealing element 210 toward the second lateral end 255. The second conductive contact 180 can also be at least partially held in the second opening 245 defined by the third sealing element 210 by a top inner lateral surface of the second opening 245 defined by the third sealing element 210. The top inner lateral surface of the second opening 245 can protrude inward into the second opening 245 defined by the third sealing element 210 toward the first lateral end 250.

The second conductive contact 180 can include any electrically conductive material, such as aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. A shape of the second conductive contact 180 can correspond or match the shape of the second opening 245 defined by the third sealing element 210. The shape of the second conductive contact 180 can be a triangular, rectangular, pentagonal, elliptical, and circular, among other shapes. The dimensions and shape of the second conductive contact 180 can be the same as dimensions and shape of the second conductive contact 180. The dimensions and shape of the second conductive contact 180 can differ as the dimensions and the shape of the second conductive contact 180. For example, the second conductive contact 180 can be a cylinder with an elliptical base, whereas the second conductive contact 180 can be a prism with a rectangular base.

The second conductive contact 180 can define or include a protrusion element 260 and a body 265. The protrusion element 260 (sometimes referred to as a tabletop) can correspond to a portion of the second conductive contact 180 extending beyond the first lateral end 250 of the second opening 245 defined by the third sealing element 210. The protrusion element 260 can extend or protrude from the first lateral end 250 of the third sealing element 210 beyond the opening 155 defined by the head region 120 of the housing 105. A height of the protrusion element 260 can be 0.3-2.0 mm. A width or length (or a diameter for cylindrical examples) of the protrusion element 260 can be 3-13 mm. The body 265 can correspond to a portion of the second conductive contact 180 below the first lateral end 250 of the second opening 245. The body 265 can correspond to a portion of the second conductive contact 180 between the first lateral end 250 and the second lateral end 255 of the second opening 245 defined by the third sealing element 210. The protrusion element 260 and the body 265 can be integral portions of the second conductive contact 180. When forming the integral portions of the second conductive contact 180, the protrusion element 260 and the body 265 can include the same electrically conductive material. The protrusion element 260 and the body 265 can form differing constituent portions of the second conductive contact 180. When forming different, constituent portions of the second conductive contact 180, the protrusion element 260 and the body 265 can include different electrically conductive materials.

The second conductive contact 180 can define, correspond to, or otherwise include the second polarity terminal for the battery cell 100. The second conductive contact 180 can function as a positive polarity terminal or a negative polarity terminal. The second conductive contact 180 can have a polarity opposite of the first conductive contact 175. The second conductive contact 180 can be bonded, joined, attached, soldered, welded, connected, or otherwise be electrically coupled to the second bonding element 165. The second conductive contact 180 can electrically couple with the second bonding element 165 connected to a second electrode (e.g., one of the cathodes 135 or one of the anodes 140). The second bonding element 165 can be connected to one of the cathodes 135 housed in the body region 110 of the battery cell 100. The second conductive contact 180 electrically coupled to the cathode 135 via the second bonding element 165 can be the positive polarity terminal. The second bonding element 165 can be connected to one of the anodes 140 housed in the body region 110 of the battery cell 100. The second conductive contact 180 electrically coupled to the anode 140 via the second bonding element 165 can be the negative polarity terminal. The second conductive contact 180 can electrically couple with the vehicle electrical distribution system (e.g., a busbar or a current collector) via another bonding element from the vehicle electrical distribution system. The bonding element from the vehicle electrical distribution system can be bonded, welded, attached, connected, or otherwise electrically coupled to an area provided by a lateral end (e.g., a top lateral surface) of the second conductive contact 180. The connection with the electrical distribution system of the electrical vehicle is detailed below in conjunction with FIGS. 4-6, among others.

The second protector element 270 can be disposed, fixed, arranged, positioned, or otherwise included between the third sealing element 210 and the first electrode (e.g., one of the cathodes 135 or one of the anodes 140) connected to second bonding element 165. The second protector element 270 can be at least partially disposed, fixed, arranged, positioned, seated, or otherwise included in the second opening 245 defined by the third sealing element 210. When at least partially disposed within the second opening 245, the bottom lateral surface of the second opening 245 defined by the third sealing element 210 can retain, hold, or support the second protector element 270. A lateral end of the second protector element 270 (e.g., a top lateral surface) can be partially or fully flush with a lateral end of the second conductive contact 180 (e.g., a bottom lateral surface) at the second lateral end 225 of the second opening 245 defined by the third sealing element 210. The second protector element 270 can also be positioned separated from the second conductive contact 180 and the third sealing element 210 (e.g., by 0.1-5 mm). The second protector element 270 can be partially situated below and away from the third sealing element 210 in the head region 120, the neck region 115, or the body region 110. The second protector element 270 can be positioned or situated above a lateral end (e.g., a top lateral surface) of the container 125 included in the body region 110 of the housing 105. The second protector element 270 can be bonded, joined, attached, soldered, welded, connected, or be coupled to either the second bonding element 165 or the second conductive contact 180, or both the second bonding element 165 and the second conductive contact 180. The second protector element 270 can be electrically coupled the second bonding element 165 and the second conductive contact 180 to form a series connection from the first electrode to the second conductive contact 180.

The second protector element 270 can react to a second failure condition (sometimes referred to a failure event or a catastrophic failure) that occurs within the body region 110 of the housing 105. The second failure condition can be related to current, voltage, temperature, or pressure originating from within the body region 110 of the housing 105 for the battery cell 100. For example, the second failure condition can include an excessively high current or overvoltage event (e.g., above 4.2 volts originating from the cathodes 135 and anodes 140), resulting in lithium plating in the anodes 140 of a lithium-ion battery cell. The second failure condition can also include an excessively low current or under-voltage event (e.g., below 2 volts discharged from the cathodes 135 and anodes 140), leading to chemical breakdown of the cathodes 135 and anodes 140. The second failure condition can include a dramatic increase in temperature and pressure within the body region 110 from a thermal runaway (e.g., temperature of more than 110° C. or a pressure of more than 1,000 kPa).

The second protector element 270 can be of a second mechanism type to react to the second failure condition occurring within the body region 110 of the housing 105. The second protector element 270 can, for example, include a current interrupt device (CID), an electrical fuse, a thermal fuse, a rupture disk, or a printed circuit board (PCB) protection board, among others. In response to an occurrence of the second failure condition, the second protector element 270 can react to the second failure condition. The second protector element 270 can include a CID initially electrically coupled between the second conductive contact 180 and the second bonding element 165 in series. In response to the occurrence of the second failure condition (e.g., excess voltage over 4.0 volts or pressure above 1,000 kPa), the CID of the second protector element 270 can initially electrically decouple the second conductive contact 180 from the second electrode connected to the second bonding element 165. The second protector element 270 can include an electrical fuse (e.g., a polymeric positive temperature coefficient device) electrically coupled between the second conductive contact 180 and the second bonding element 165 in series. In response to the occurrence of the second failure condition (e.g., excess voltage over 4.3 volts), the electrical fuse of the second protector element 270 can electrically decouple the second conductive contact 180 from the second electrode connected to the second bonding element 165. The second protector element 270 can include a thermal fuse initially electrically coupled between the second conductive contact 180 and the second bonding element 165 in series. In response to the occurrence of the second failure condition (e.g., temperatures above 70° C.), the thermal fuse can electrically decouple the second conductive contact 180 from the second electrode connected to the second bonding element 165. The second protector element 270 can include a rupture disk initially connected between the second conductive contact 180 and the second bonding element 165 in series. In response to the occurrence of the second failure condition (e.g., pressure above 2,000 kPa), the rupture disk of the second protector element 270 can burst to vent pressure from within the body region 110 of the housing 105, causing the electrical decoupling of the second conductive contact 180 from the second bonding element 165. The second protector element 270 can include a PCB protection board initially electrically coupled to the second conductive contact 180 and the second bonding element 165. In response to the occurrence of the second failure condition (e.g., excess voltage over 4.0 volts or below 2.3 volts), the PCB protection board can electrically decouple the second conductive contact 180 from the second electrode connected to the second bonding element 165.

In relation to the first protector element 240, the second mechanism type of the second protector element 270 can differ from the first mechanism type of the first protector element 240. For example, the first protector element 240 can include a current interrupt device (CID) to react to the first failure event (e.g., excessive voltage over 4.8V) by electrically decoupling the first conductive contact 175 from the first electrode connected to the first bonding element 160. In contrast, the second protector element 270 can include a rupture disk to react by fracturing during the second failure event (e.g., pressure over 1,500 kPa) to electrically decouple the second conductive contact 180 from the second electrode connected to the second bonding element 165. Furthermore, the second failure condition reacted to by the second protector element 270 can differ from the first failure condition reacted to by the first protector element 240. For example, the first protector element 240 can include a PCB protector board to react to voltages over 3.6V, whereas the second protector element 270 can include a thermal fuse to break in temperatures above 150° C. The redundancies in incorporating both the first protector element 240 and the second protector element 270 can protect the battery cell 100 from multiple failure conditions (e.g., thermal conditions and over-voltage events) originating within the housing 105. In addition, the first protector element 240 and the second protector element 270 both can differ from another protector element in another battery cell in the battery pack for the electric vehicle. In this manner, at least a subset of the battery cells across the battery pack can be maintained and protected, in the event that a failure event affects multiple battery cells.

Figure 3:
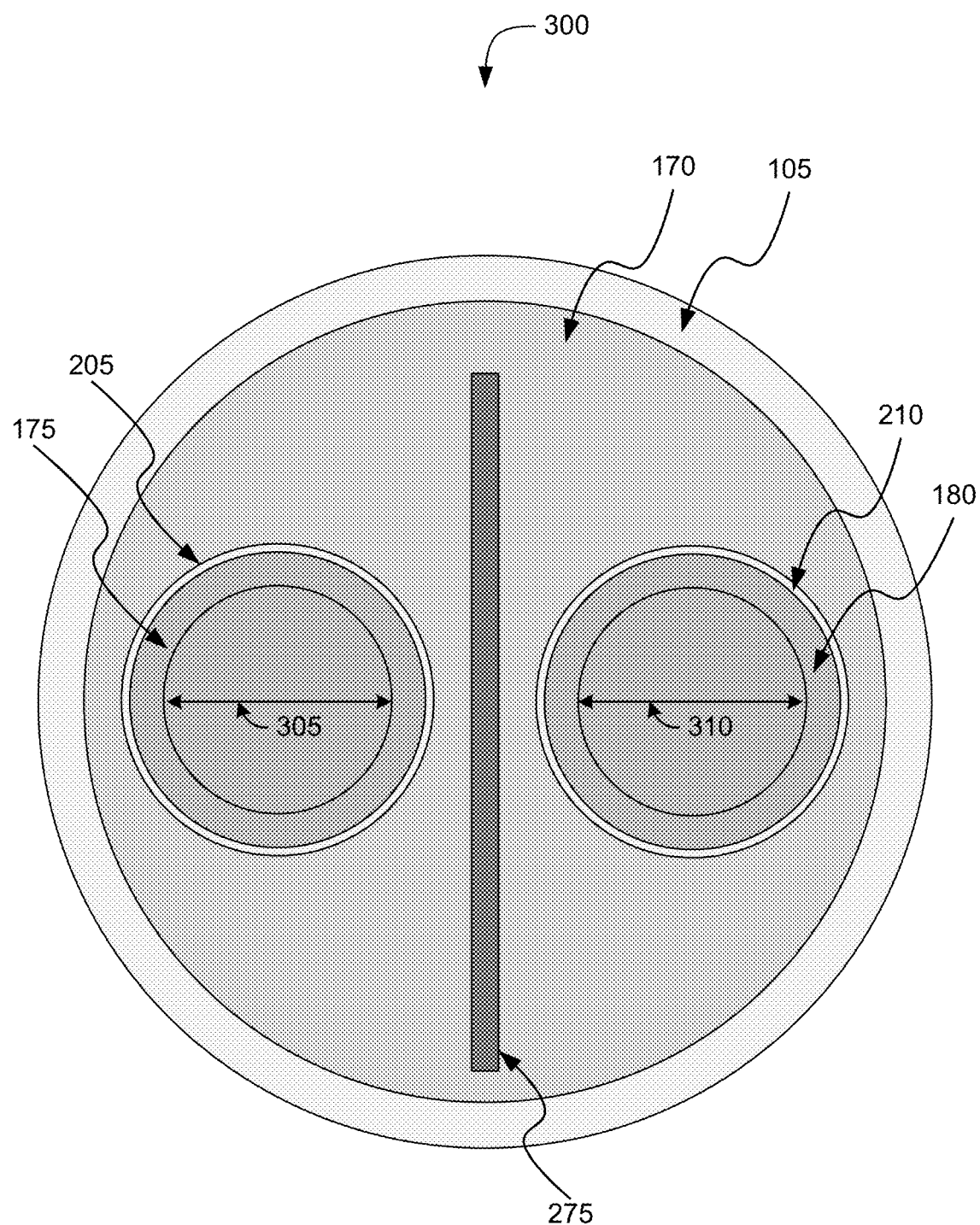
FIG. 3 is a block diagram depicting a top-down view of an example of a head region of a battery cell for a battery pack in an electric vehicle.

Referring to FIG. 3, depicted is a top-down view 300 of an example of the head region 120 of the battery cell 100 for a battery pack in an electric vehicle. For example, the housing 105 can be a cylinder with a circular base, and some the components exposed to the opening 155 defined by the head region 120 of the housing 105 can be cylindrical as well. The first sealing element 170 can form a mechanical seal across the opening 155 defined by the longitudinal wall of the head region 120 of the housing 105 for the battery cell 100. The first sealing element 170 can define two slots, the first slot 185 and the second slot 190. The first sealing element 170 can have the divider element 275 to delineate a first portion defining the first slot 185 from a second portion defining the second slot 190. The divider 275 can partially span the opening 155 defined by the longitudinal wall of the head region 120 of the housing 105. The second sealing element 205 can be disposed in the first slot 185 to form a mechanical seal therein. The third sealing element 210 can be disposed in the second slot 190 to form a mechanical seal therein. The second sealing element 205 can define a first opening 215 to seat the first conductive contact 175 to define the first polarity terminal of the battery cell 100. The third sealing element 210 can define a second opening 245 to seat the second conductive contact 180 to define the second polarity terminal of the battery cell 100. In this manner, both the first conductive contact 175 and the second conductive contact 180 can be exposed via the opening 155 defined by the head region 120 of the housing 105 for the battery cell 100.

The first conductive contact 175 can have the protrusion element 230 protruding out from the second sealing element 205. The protrusion element 230 of the first conductive contact 175 can have a diameter 305 (or width or length in non-cylindrical examples) can be 3-13 mm. The first conductive contact 175 can provide a first area for the first polarity terminal to bond with another bonding element (e.g., from the busbar or current collector) from outside the housing 105. The first area available for bonding can be defined by the diameter 305. The second conductive contact 180 can have the protrusion element 260 protruding out from the third sealing element 210. The protrusion element 260 of the second conductive contact 180 can have a diameter 310 (or width or length in non-cylindrical examples) can be 3-17 mm. The second conductive contact 180 can provide a second area for the second polarity terminal to bond with another bonding element (e.g., from the busbar or current collector) from outside the housing 105. The second area available for bonding can be defined by the diameter 310. The diameter 310 of the protrusion element 260 for the second conductive contact 180 can differ from the diameter 305 of the protrusion element 230 for the first conductive contact 175. The second area available for bonding defined by the diameter 310 can also differ from the first area available for bonding defined by the diameter 305.

Figure 4:
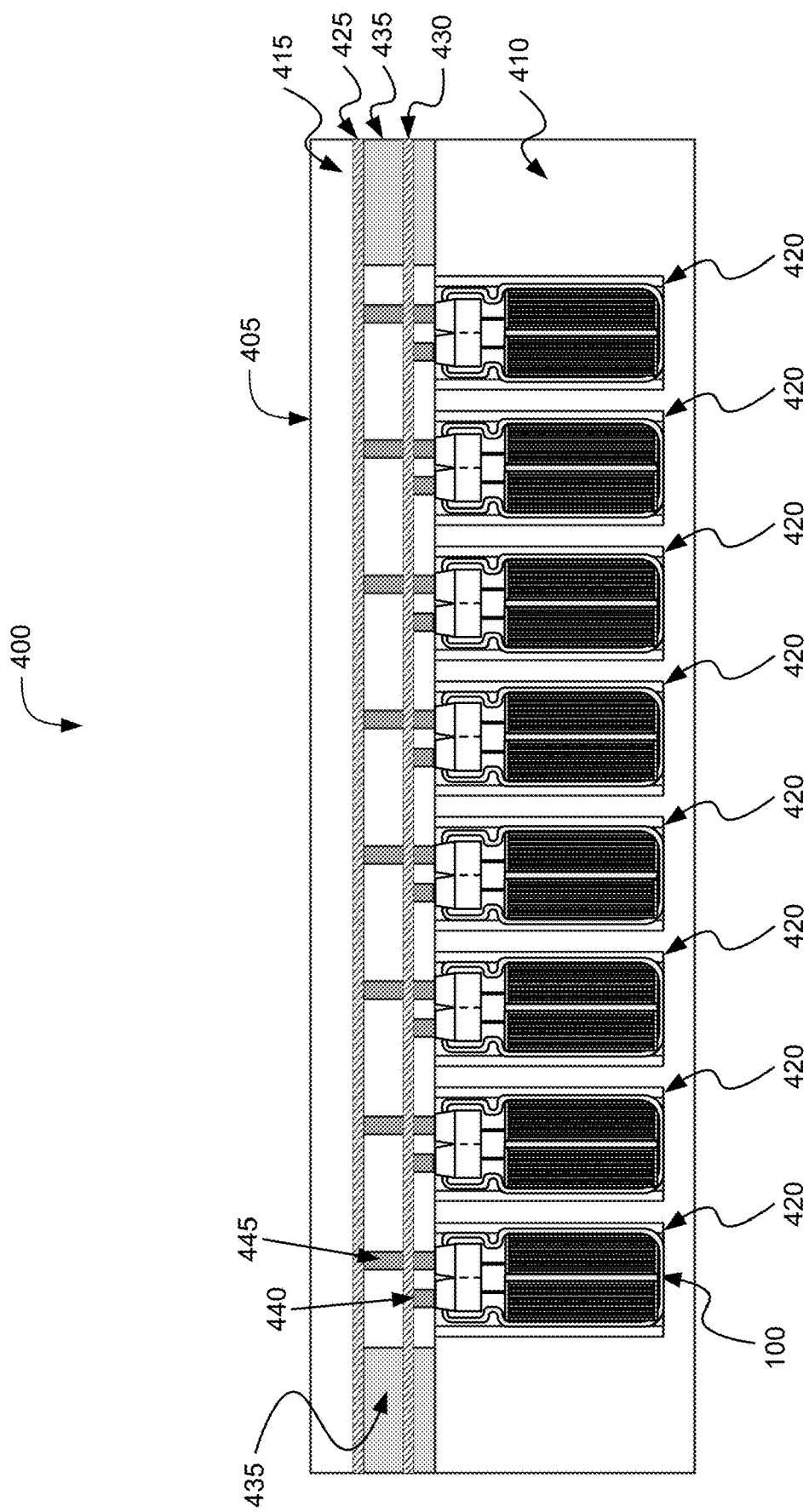
FIG. 4 is a block diagram depicting a cross-sectional view of an example battery pack for holding battery cells in an electric vehicle.

Referring to FIG. 4, depicted is a cross-section view 400 of a battery pack 405 to hold a plurality of battery cells 100 in an electric vehicle. The battery pack 405 can include a battery module case 410 and a capping element 415. The battery module case 410 can be separated from the capping element 415. The battery module case 410 can include or define a plurality of holders 420. Each holder 420 can include a hollowing or a hollow portion defined by the battery module case 410. Each holder 420 can house, contain, store, or hold a battery cell 100. The battery module case 410 can include at least one electrically or thermally conductive material, or combinations thereof. The battery module case 410 can include one or more thermoelectric heat pumps. Each thermoelectric heat pump can be thermally coupled directly or indirectly to a battery cell 100 housed in the holder 420. Each thermoelectric heat pump can regulate temperature or heat radiating from the battery cell 100 housed in the holder 420. The first bonding element 160 and the second bonding element 165 can extend from the battery cell 100 through the respective holder 420 of the battery module case 410.

Between the battery module case 410 and the capping element 415, the battery pack 405 can include a first busbar 425, a second busbar 430, and an electrically insulative layer 435. The first busbar 425 and the second busbar 430 can each include an electrically conductive material to provide electrical power to other electrical components in the electric vehicle. The first busbar 425 (sometimes referred to as a first current collector) can be connected or otherwise electrically coupled to the first bonding element 160 extending from each battery cell 100 housed in the plurality of holders 420 via a bonding element 445. The bonding element 445 can be bonded, welded, connected, attached, or otherwise electrically coupled to the first conductive contact 175 exposed via the opening 155 of the head region 120 of the battery cell 100. For example, the bonding element 445 can be welded onto a top surface area of the first conductive contact 175 defined by the diameter 305. As discussed above, the first conductive contact 175 can define the first polarity terminal for the battery cell 100. The first busbar 425 can define the first polarity terminal for the battery pack 405. The second busbar 430 (sometimes referred to as a second current collector) can be connected or otherwise electrically coupled to the second bonding element 165 extending from each battery cell 100 housed in the plurality of holders 420 via a bonding element 440. The bonding element 440 can be bonded, welded, connected, attached, or otherwise electrically coupled to the second conductive contact 180 exposed via the opening 155 of the head region 120 of the battery cell 100. For example, the bonding element 440 can be welded onto a top surface area of the second conductive contact 180 defined by the diameter 310. As discussed above, the second conductive contact 180 can define the second polarity terminal for the battery cell 100. The second busbar 430 can define the second polarity terminal for the battery pack 405.

The first busbar 425 and the second busbar 430 can be separated from each other by the electrically insulative layer 435. The electrically insulative layer 435 can include spacing to pass or fit the first bonding element 160 connected to the first busbar 425 and the second bonding element 165 connected to the second busbar 430. The electrically insulative layer 435 can partially or fully span the volume defined by the battery module case 410 and the capping element 415. A top plane of the electrically insulative layer 435 can be in contact or be flush with a bottom plane of the capping element 415. A bottom plane of the electrically insulative layer 435 can be in contact or be flush with a top plane of the battery module case 410. The electrically insulative layer 435 can include any electrically insulative material or dielectric material, such as air, nitrogen, sulfur hexafluoride ($SF_6$), porcelain, glass, and plastic (e.g., polysiloxane), among others to separate the first busbar 425 from the second busbar 430.

Figure 5:
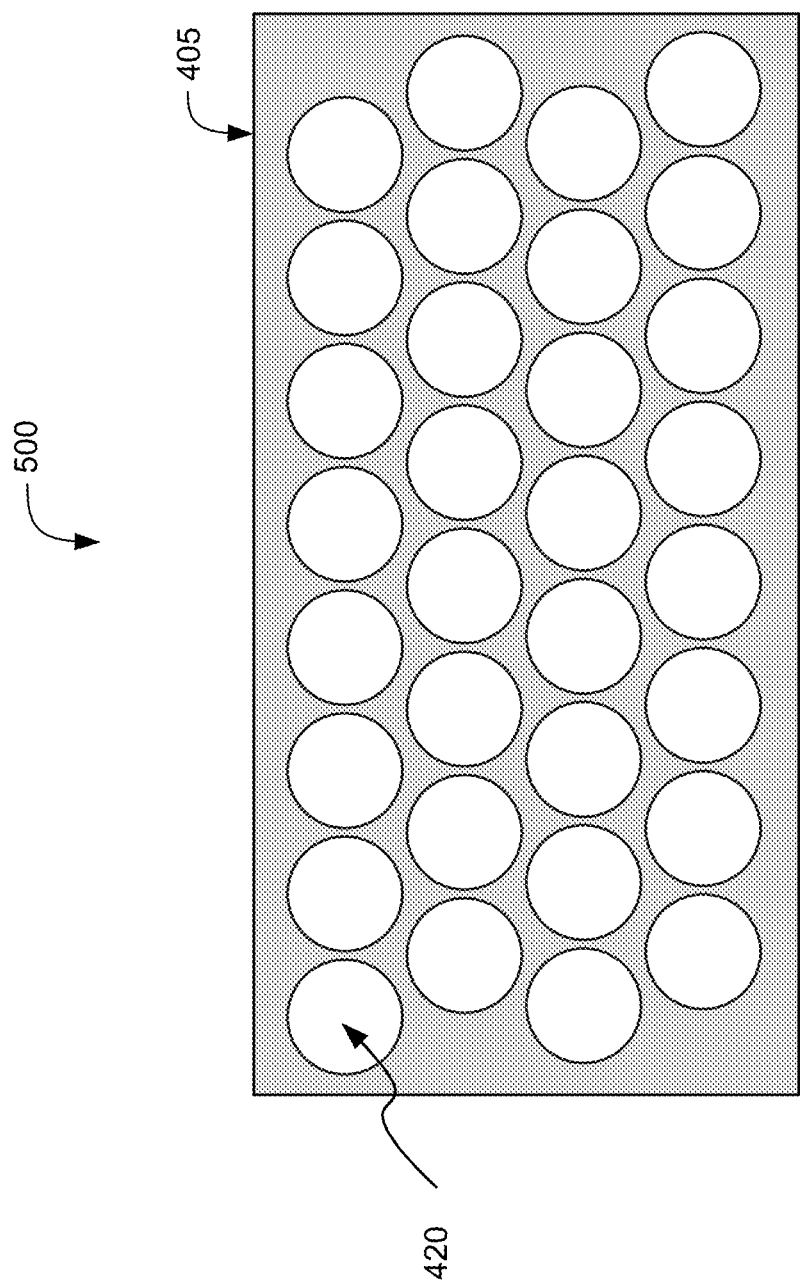
FIG. 5 is a block diagram depicting a top-down view of an example battery pack for holding for battery cells in an electric vehicle.

Referring to FIG. 5, depicted is a top-down view 500 of a battery pack 405 to a hold a plurality of battery cells 100 in an electric vehicle. The battery pack 405 can define or include a plurality of holders 420. The shape of each holder 420 can be triangular, rectangular, pentagonal, elliptical, and circular, among others. The shapes of each holder 420 can vary or can be uniform throughout the battery pack 405. For example, some holders 420 can be hexagonal in shape, whereas other holders can be circular in shape. The shape of the holder 420 can match the shape of the housing 105 of each battery cell 100 housed therein. The dimensions of each holder 420 can be larger than the dimensions of the battery cell 100 housed therein.

Figure 6:
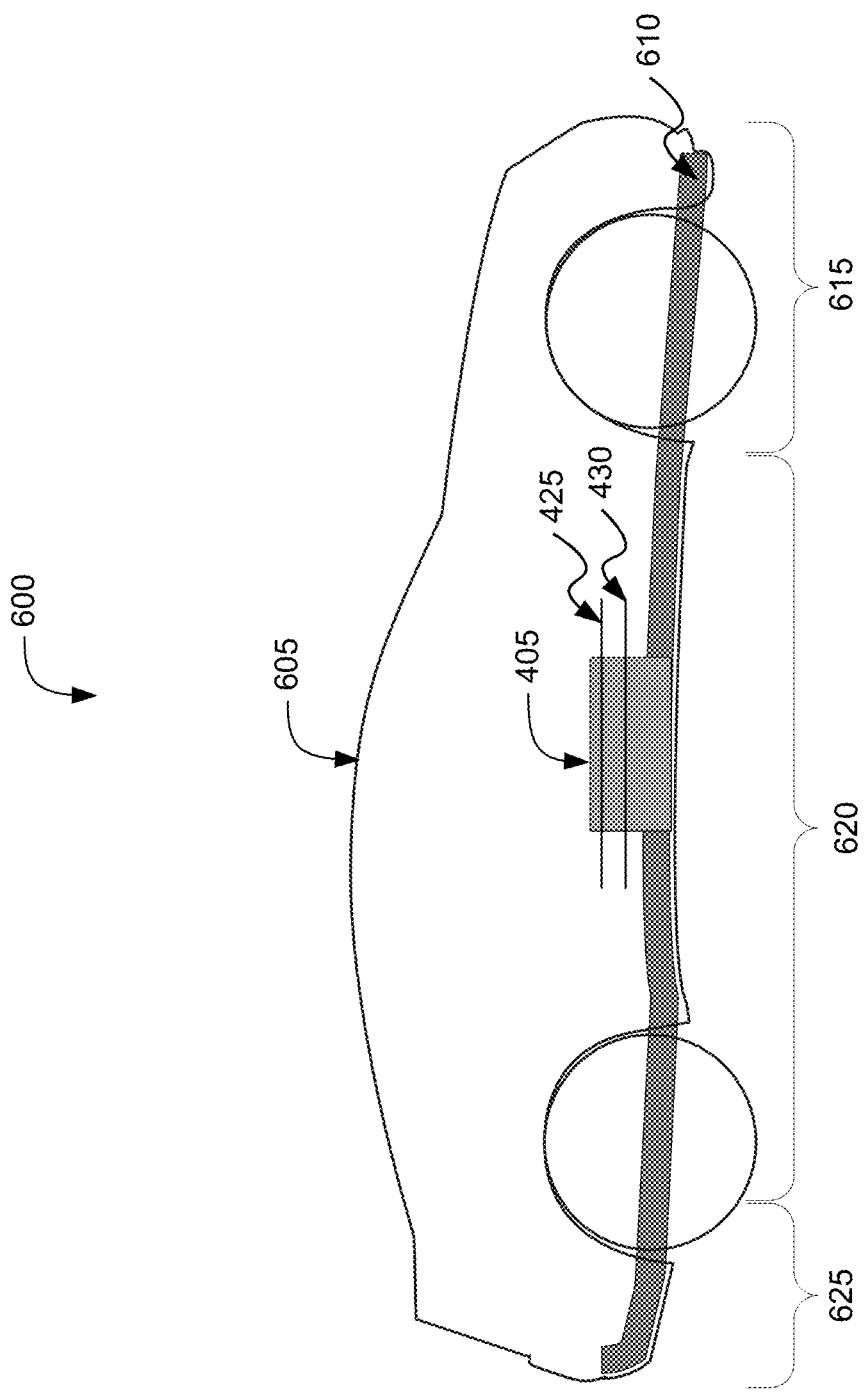
FIG. 6 is a block diagram depicting a cross-sectional view of an example electric vehicle installed with a battery pack.

Referring to FIG. 6, depicted is a cross-section view 600 of an electric vehicle 605 installed with a battery pack 405. The electric vehicle 605 can include a chassis 610 (sometimes referred to as a frame, internal frame, or support structure). The chassis 610 can support various components of the electric vehicle 605. The chassis 610 can span a front portion 615 (sometimes referred to a hood or bonnet portion), a body portion 620, and a rear portion 625 (sometimes referred to as a trunk portion) of the electric vehicle 605. The battery pack 405 can be installed or placed within the electric vehicle 605. The battery pack 405 can be installed on the chassis 610 of the electric vehicle 605 within the front portion 615, the body portion 620 (as depicted in FIG. 6), or the rear portion 625. The first busbar 425 and the second busbar 430 can be connected or otherwise be electrically coupled to other electrical components of the electric vehicle 605 to provide electrical power.

Figure 7:
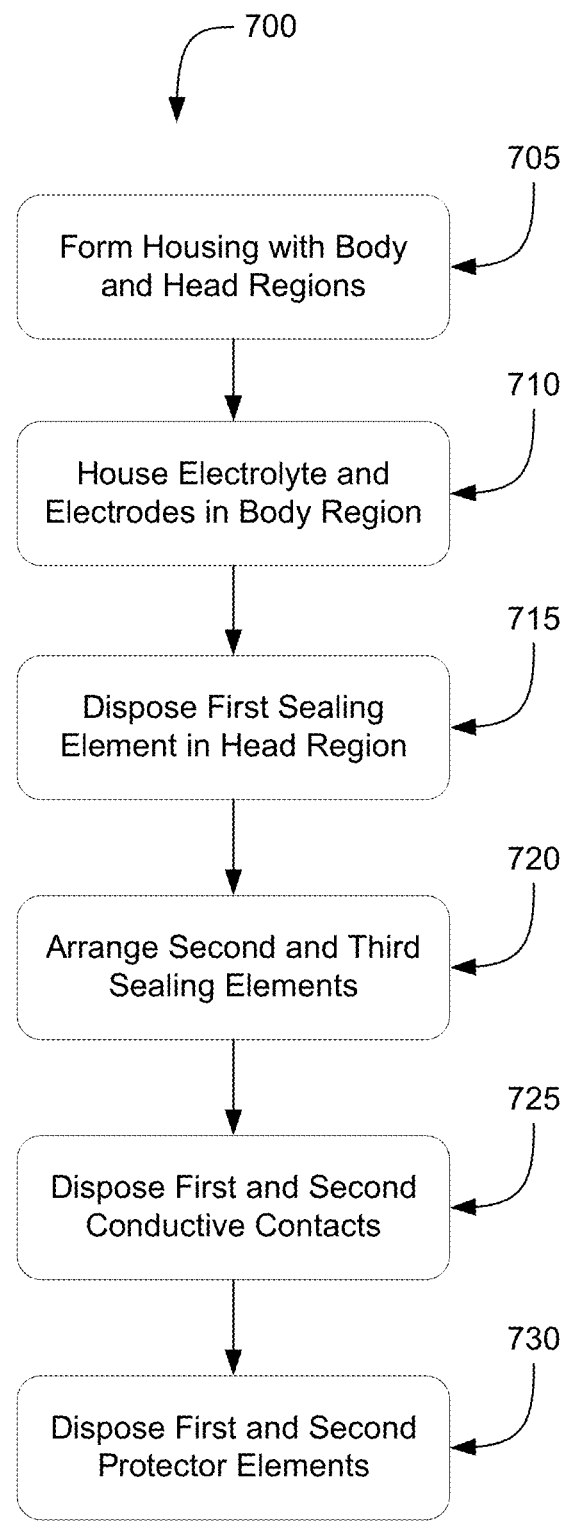
FIG. 7 is a flow diagram depicting an example method of providing battery cells for battery packs for electric vehicles.

Referring to FIG. 7, depicted is a method 700 of providing battery cells 100 for battery packs 405 of electric vehicles 605. The functionalities of the method 700 can be implemented or performed using any of the systems, apparatuses, or battery cells detailed above in conjunction with FIGS. 1-7. In brief overview, the method 700 can include forming a housing 105 for a battery cell 100 including a body region 110 and a head region 120 (ACT 705). The method 700 can include housing an electrolyte and electrodes 135 and 140 in the body region 110 (ACT 710). The method 700 can include disposing a first sealing element 170 in the head region 120 (ACT 715). The method 700 can include arranging a second sealing element 205 and a third sealing element 210 in the first sealing element 170 (ACT 720). The method 700 can include disposing a first conductive contact 175 in the second sealing element 205 and a second conductive contact 180 in the third sealing element 210 (ACT 725). The method 700 can include disposing a first protector element 240 and a second protector element 270 (ACT 730).

The method 700 can include forming a housing 105 for a battery cell 100 including a body region 110 and a head region 120 (ACT 705). The battery cell 100 can be a lithium ion battery cell, a nickel-cadmium battery cell, or a nickel-metal hydride battery cell. The battery cell 100 can be part of a battery pack 405 installed within a chassis 610 of an electric vehicle 605. The housing 105 can be formed from a cylindrical casing with a circular, ovular, or elliptical base or from a prismatic casing with a polygonal base. A neck region 115 can also be formed on the housing 105 for the battery cell 100. The neck region 115 can be defined by an indentation protruding between the body region 110 and the head region 120. The indentation 150 of the neck region 115 can be formed by crimping, squeezing, or applying any pressure on an outer surface of the housing 105 along one axis. The housing 105 can also have an opening 155 spanning a lateral end of the head region 120.

The method 700 can include housing an electrolyte and electrodes 135 and 140 in the body region 110 (ACT 710). The body region 110 can house or include a cathode (e.g., the electrode 135), an anode (e.g., the electrode 140), and a separator 130 to divide the cathode from the anode. The separator 130 can also include or contain an electrolyte. The cathode, the anode, and the separator 130 can be placed or inserted into the body region 110 of the housing 105 through the opening 155. The cathode, the anode, and the separator 130 can be placed, arranged, or stacked in a layered manner. The separator 130 including the electrolyte, the cathode, and the anode can be placed or inserted into a container 125. The container 125 can be inserted or placed into inserted into the body region 110 of the housing 105. Once the anode, cathode, and the separator 130 are placed or inserted into the body region 110 of the housing 105, the indentation 150 of the neck region 115 can be formed by crimping or applying any pressure along an outer surface of the housing 105. A positive terminal bonding element (e.g., the first bonding element 160) can be connected or electrically coupled to the cathode. The positive terminal bonding element can be attached to the cathode via welding. The positive terminal bonding element can extend from the body through the neck and head of the housing for the battery cell. A negative terminal bonding element (e.g., the second bonding element 165) can be connected or electrically coupled to the anode. The negative terminal bonding element can be attached to the anode to the anode via welding. The negative terminal bonding element can extend from the body through the neck and head of the housing for the battery cell. The housing can include a thermally conductive material.

The method 700 can include disposing a first sealing element 170 in the head region 120 (ACT 715). The first sealing element 170 can be positioned to hermetically seal the electrolyte and the electrodes 135 and 140 of the battery cell 100 within the body region 110. The first sealing element 170 can include an electrically insulative material. The first sealing element 170 can be supported by a shoulder portion 280 formed by the indentation 150 of the neck region 115. The first sealing element 170 can be placed or inserted through the opening 155 of the housing 105. The first sealing element 170 can be placed or inserted into the head region 120 of the housing 105 to rest on the shoulder portion 280. The first sealing element 170 can define a first slot 185 and a second slot 190. The first slot 185 and the second slot 190 can each be a hole or an aperture passing through the first sealing element 170.

The method 700 can include arranging a second sealing element 205 and a third sealing element 210 in the first sealing element 170 (ACT 720). The second sealing element 205 can be placed or inserted through the first slot 185 defined by the first sealing element 170. The second sealing element 205 can form a mechanism seal over the first slot 185. The second sealing element 205 can include an electrically insulative material. A bottom lateral surface of the second sealing element 205 can be partially or fully supported by an inward protrusion of an inner longitudinal surface of the first slot 185 of the first sealing element 170. The second sealing element 205 can be inserted through the first slot 185 to rest of the inward protrusion of the inner longitudinal surface of the first slot 185 of the first sealing element 170. The second sealing element 205 can define a first opening 215. The first opening 215 can be a hole or an aperture passing through the second sealing element 205. The third sealing element 210 can be placed or inserted through the second slot 190 defined by the first sealing element 170. The third sealing element 210 can form a mechanism seal over the second slot 190. The third sealing element 210 can include an electrically insulative material. A bottom lateral surface of the third sealing element 210 can be partially or fully supported by an inward protrusion of an inner longitudinal surface of the second slot 190 of the first sealing element 170. The third sealing element 210 can be inserted through the second slot 190 to rest of the inward protrusion of the inner longitudinal surface of the second slot 190 of the first sealing element 170. The third sealing element 210 can define a second opening 245. The second opening 245 can be a hole or an aperture passing through the third sealing element 210.

The method 700 can include disposing a first conductive contact 175 in the second sealing element 205 and a second conductive contact 180 in the third sealing element 210 (ACT 725). The first conductive contact 175 for a first polarity terminal of the battery cell 100 can be placed or inserted through the first opening 215 defined by the second sealing element 205. A bottom lateral surface of the first conductive contact 175 can be situated, positioned, rest, or seated on an inward protrusion of an inner longitudinal surface of the first opening 215 defined by the second sealing element 205. A protrusion element 230 of the first conductive contact 175 can protrude beyond a first lateral end 220 of the second sealing element 205. A body 235 of the first conductive contact 175 can be partially or fully flush with the inner longitudinal surface of the first opening 215 defined by the second sealing element 205. The first conductive contact 175 can include any electrically conductive material for electrically coupling with one of the cathodes 135 or the anodes 140 via the first bonding element 160. The first conductive contact 175 can be bonded, welded, connected, or attached with the first bonding element 160 to electrically couple with one of the cathodes 135 or anodes 140.

The second conductive contact 180 for a second polarity terminal of the battery cell 100 can be placed or inserted through the second opening 245 defined by the third sealing element 210. A bottom lateral surface of the second conductive contact 180 can be situated, positioned, rest, or seated on an inward protrusion of an inner longitudinal surface of the second opening 245 defined by the third sealing element 210. A protrusion element 260 of the second conductive contact 180 can protrude beyond a first lateral end 250 of the third sealing element 210. A body 265 of the second conductive contact 180 can be partially or fully flush with the inner longitudinal surface of the second opening 245 defined by the third sealing element 210. The second conductive contact 180 can include any electrically conductive material for electrically coupling with one of the cathodes 135 or the anodes 140 via the second bonding element 165. The second conductive contact 180 can be bonded, welded, connected, or attached with the second bonding element 165 to electrically couple with one of the cathodes 135 or anodes 140.

The method 700 can include disposing a first protector element 240 and a second protector element 270 (ACT 730). The first protector element 240 can be placed or through the first opening 215 defined by the second sealing element 205. The first protector element 240 can also be placed into the housing 105 of the battery cell 105, prior to the insertion of the first sealing element 170, the second sealing element 205, the third sealing element 210, the first conductive contact 175, or the second conductive contact 180. An outer longitudinal surface of the first protector element 240 can be partially flush, in contact, or supported by the inner longitudinal surface of the first opening 215 defined by the second sealing element 205. The first protector element 240 can be fitted partially into the first opening 215 defined by the second sealing element 205. The first protector element 240 can be bonded, attached, joined, connected, or otherwise made to electrically couple with both the first conductive contact 175 and the first bonding element 160. For example, the first protector element 240 can be connected between the first conductive contact 175 and the first bonding element 160. The first protector element 240 can react to a first failure condition related to current, voltage, temperature, or pressure occurring from within the body region 110 of the housing 105. The first protector element 240 can be of a first mechanical type, and can include a current interrupt device (CID), an electrical fuse, a thermal fuse, a rupture disk, or a printed circuit board (PCB) protection board, among others.

The second protector element 270 can be placed or through the second opening 245 defined by the third sealing element 210. The second protector element 270 can also be placed into the housing 105 of the battery cell 105, prior to the insertion of the first sealing element 170, the second sealing element 205, the third sealing element 210, the first conductive contact 175, or the second conductive contact 180. An outer longitudinal surface of the second protector element 270 can be partially flush, in contact, or supported by the inner longitudinal surface of the second opening 245 defined by the third sealing element 210. The second protector element 270 can be fitted partially into the second opening 245 defined by the third sealing element 210. The second protector element 270 can be bonded, attached, joined, connected, or otherwise made to electrically couple with both the second conductive contact 180 and the second bonding element 165. For example, the second protector element 270 can be connected between the second conductive contact 180 and the second bonding element 165. The second protector element 270 can react to a second failure condition related to current, voltage, temperature, or pressure occurring from within the body region 110 of the housing 105. The second failure condition can differ from the first failure condition to which the first protector element 240 can react. The second protector element 270 can be of a second mechanical type, and can include a current interrupt device (CID), an electrical fuse, a thermal fuse, a rupture disk, or a printed circuit board (PCB) protection board, among others. The second mechanical type of the second protector element 270 can differ from the first protector element 240. In this manner, redundancies in protective countermeasures can be incorporated into the battery cell 100.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A battery cell for electric vehicles, the battery cell comprising:
   a cylindrical housing, the cylindrical housing having a body region and a head region, the body region including an electrolyte, a first electrode, and a second electrode, the head region defining an opening at a lateral end of the cylindrical housing;
   a first sealing element disposed in the opening defined by the head region, the first sealing element comprised of an electrically insulative material, the first sealing element defining a first slot and a second slot;
   a second sealing element disposed in the first slot defined by the first sealing element, the second sealing element defining a first opening for a first polarity terminal;
   a third sealing element disposed in the second slot defined by the first sealing element, the third sealing element defining a second opening for a second polarity terminal;
   a first conductive contact disposed in the first opening defined by the second sealing element, the first conductive element including the first polarity terminal to electrically couple with a first bonding element connected to the first electrode;
   a second conductive contact disposed in the second opening defined by the third sealing element, the second conductive element including the second polarity terminal to electrically coupled with a second bonding element connected to the second electrode, the second conductive contact electrically isolated from the first conductive contact via the first sealing element, the second sealing element, and the third sealing element;
   a first protector element disposed between the second sealing element and the first electrode to react during a first failure condition that occurs within the body region; and
   a second protector element disposed between the third sealing element and the second electrode to react during a second failure condition that occurs within the body region, the second failure condition different from the first failure condition.

2. The battery cell of claim 1, comprising:
   the first sealing element having a divider element to separate a first portion of the first sealing element defining the first slot from a second portion of the first sealing element defining the second slot.

3. The battery cell of claim 2, comprising:
   the first portion of the first sealing element comprised of the electrically insulative material;
   the second portion of the first sealing element comprised of the electrically insulative material; and the divider element disposed in the first sealing element comprised of a metallic material, the metallic material surrounded by the electrically insulative material of the first portion and the second portion of the first sealing element.

4. The battery cell of claim 1, comprising:
the first protector element including a first mechanism type to react in response to the first failure condition within the body region; and
the second protector element including a second mechanism type to react in response to the second failure condition within the body region, the second mechanism type different from the first mechanism type.

5. The battery cell of claim 1, comprising:
the first protector element including a current interrupt device (CID) to react during the first failure condition by electrically decoupling the first conductive contact to the first electrode, the current interrupt device initially electrically coupling the first bonding element to the first conductive contact; and
the second protector element including a rupture disk to react during the second failure condition by fracturing to vent pressure arising from the body region of the cylindrical housing.

6. The battery cell of claim 1, comprising:
the first conductive contact having a first protrusion element for the first polarity terminal, the first protrusion element protruding from a lateral end of the second sealing element through the opening at the lateral end of the cylindrical housing; and
the second conductive contact having a second protrusion element for the second polarity terminal, the second protrusion element protruding from a lateral end of the third sealing element through the opening at the lateral end of the cylindrical housing.

7. The battery cell of claim 6, comprising:
the first protrusion element of the first conductive contact having a cylindrical shape and having a height of 0.5 to 1.5 mm and a diameter of 6 mm to 15 mm; and
the second protrusion element of the second conductive contact having a cylindrical shape and having a height of 0.5 to 1.5 mm and a diameter of 6 to 15 mm.

8. The battery cell of claim 1, comprising:
the cylindrical housing having a neck region between the head region and the body region, the neck region defining an indentation between the head region and the body region, a width of the neck region less than a width of the head region and a width of the body region.

9. The battery cell of claim 1, comprising:
the first sealing element forming a mechanical seal across the opening defined by the head region of the cylindrical housing to retain the electrolyte, the first electrode, the second electrode, the first conductive contact, the second conductive contact, the first protector element, and the second protector element disposed in the cylindrical housing.

10. The battery cell of claim 1, comprising:
the second sealing element mechanically sealing the first slot defined by the first sealing element to retain the first conductive contact and the first protector element; and
the third sealing element mechanically sealing the second slot defined by the first sealing element to retain the second conductive contact and the second protector element.

11. The battery cell of claim 1, comprising:
the first polarity terminal of the second conductive contact corresponding to a positive terminal, the first bonding element to electrically couple the positive terminal with the first electrode corresponding to an anode; and
the second polarity terminal of the second conductive contact corresponding to a negative terminal, the second bonding element to electrically couple the negative terminal with the second electrode corresponding to a cathode.

12. The battery cell of claim 1, comprising:
the first conductive contact providing a first area for the first polarity terminal to bond with a third bonding element; and
the second conductive contact providing a second area for the second polarity terminal to bond with a fourth bonding element.

13. The battery cell of claim 1, comprising:
the cylindrical housing having a height between 65 mm to 75 mm and a diameter of 16 mm to 26 mm.

14. The battery cell of claim 1, comprising:
the housing comprised of an electrically insulative and thermally conductive material to thermally couple to a thermoelectric heat pump.

15. A method of providing battery cells for battery packs of electric vehicles, comprising:
providing a cylindrical housing for a battery cell of a battery pack having a plurality of battery cells, the cylindrical housing having a body region and a head region, the head region defining an opening at a lateral end of the cylindrical housing;
housing, within the body region, an electrolyte, a first electrode, and a second electrode;
disposing, in the opening defined by the head region, a first sealing element defining a first slot and a second slot, the first sealing element comprised of an electrically insulative material;
arranging, in the first slot defined by the first sealing element, a second sealing element defining a first opening for a first polarity terminal;
arranging, in the second slot defined by the first sealing element, a third sealing element defining a second opening for a second polarity terminal;
disposing, in the first opening defined by the second sealing element, a first conductive element including the first polarity terminal to electrically couple with a first bonding element connected to the first electrode;
disposing, in the second opening defined by the third sealing element, a second conductive element including the second polarity terminal to electrically coupled with a second bonding element connected to the second electrode, the second conductive contact electrically isolated from the first conductive contact via the first sealing element, the second sealing element, and the third sealing element;
disposing, between the second sealing element and the first electrode, a first protector to react during a first failure condition that occurs within the body region; and
disposing, between the third sealing element and the second electrode, a second protector to react during a second failure condition that occurs within the body region, the second failure condition different from the first failure condition.

16. The method of claim 15, comprising:
bonding on a first area defined by the first conductive contact a third bonding element from outside the cylindrical housing; and bonding on a second area defined by the second conductive contact a fourth bonding element from outside the cylindrical housing.

17. An electric vehicle, comprising:
one or more components; and
a battery pack storing holding a plurality of battery cells to provide electrical power to the one or more components, each battery cell of the plurality of battery cells including:
  a cylindrical housing having a body region and a head region, the body region including an electrolyte, a first electrode, and a second electrode, the head region defining an opening at a lateral end of the cylindrical housing;
  a first sealing element disposed in the opening defined by the head region, the first sealing element comprised of an electrically insulative material, the first sealing element defining a first slot and a second slot;
  a second sealing element disposed in the first slot defined by the first sealing element, the second sealing element defining a first opening for a first polarity terminal;
  a third sealing element disposed in the second slot defined by the first sealing element, the third sealing element defining a second opening for a second polarity terminal;
  a first conductive contact disposed in the first opening defined by the second sealing element, the first conductive element including the first polarity terminal to electrically couple with a first bonding element connected to the first electrode;
  a second conductive contact disposed in the second opening defined by the third sealing element, the second conductive element including the second polarity terminal to electrically coupled with a second bonding element connected to the second electrode, the second conductive contact electrically isolated from the first conductive contact via the first sealing element, the second sealing element, and the third sealing element;
  a first protector element disposed between the second sealing element and the first electrode to react during a first failure condition that occurs within the body region; and
  a second protector element disposed between the third sealing element and the second electrode to react during a second failure condition that occurs within the body region, the second failure condition different from the first failure condition.

18. The electric vehicle of claim 17, comprising:
the first protector element including a first mechanism type to react in response to the first failure condition that occurs within the body region; and
the second protector element including a second mechanism type to react in response the second failure condition that occurs within the body region, the second mechanism type different from the first mechanism type and a third mechanism type, the first mechanism type different from the third mechanism type, the third mechanism type for a third protector element disposed of a second battery cell in the battery pack.

19. The electric vehicle of claim 17, comprising:
the first conductive contact to electrically couple the first electrode of the body region via the first bonding element with a first busbar; and
the second conductive contact to electrically couple the second electrode of the body region via the second bonding element with a second busbar.

20. The electric vehicle of claim 17, comprising:
the first conductive contact providing a first area for the first polarity terminal to bond with a third bonding element that is coupled with a first busbar; and
the second conductive contact providing a second area for the second polarity terminal to bond with a fourth bonding element that is coupled with a second busbar.

* * * * *